(12) United States Patent
Rakos

(10) Patent No.: US 9,982,999 B2
(45) Date of Patent: May 29, 2018

(54) METROLOGY METHOD

(71) Applicant: DUPONT TEIJIN FILMS U.S. LIMITED PARTNERSHIP, Chester, VA (US)

(72) Inventor: Karl Rakos, Durham (GB)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 404 days.

(21) Appl. No.: 14/429,139

(22) PCT Filed: Sep. 19, 2013

(86) PCT No.: PCT/GB2013/052455
§ 371 (c)(1),
(2) Date: Mar. 18, 2015

(87) PCT Pub. No.: WO2014/045038
PCT Pub. Date: Mar. 27, 2014

(65) Prior Publication Data
US 2015/0241210 A1    Aug. 27, 2015

(51) Int. Cl.
*G06K 9/00* (2006.01)
*G01B 11/30* (2006.01)
(Continued)

(52) U.S. Cl.
CPC .......... *G01B 11/30* (2013.01); *G01B 9/02032* (2013.01); *G01B 9/02048* (2013.01); *G01B 11/2441* (2013.01)

(58) Field of Classification Search
USPC ............................ 382/141, 145; 250/559.16
See application file for complete search history.

(56) References Cited

U.S. PATENT DOCUMENTS

| 5,133,601 A | 7/1992 | Cohen |
| 5,471,303 A | 11/1995 | Ai |

(Continued)

FOREIGN PATENT DOCUMENTS

| WO | 03087247 | 10/2003 |
| WO | 2012123699 | 9/2012 |

OTHER PUBLICATIONS

Great Britain Search Report for Great Britain Application No. GB1216722.7 dated Nov. 23, 2012.
(Continued)

*Primary Examiner* — Lam Nguyen
(74) *Attorney, Agent, or Firm* — RatnerPrestia

(57) ABSTRACT

An interferometric method for profiling the topography of a sample surface comprises: (i) a first interferometric profiling step at a first magnification M1 to produce a map comprising pixels with planar (X,Y)-coordinates corresponding to the area of the sample surface, (ii) identifying pixel(s) which meet or exceed a Cut-Off Threshold, and meet or exceed a parameter $N_{NAP}$; (iii) identifying pixel(s) for which no z-coordinate has been recorded; (iv) generating a Low Magnification Frame File (LMFF) which comprises the (X,Y) coordinates of the pixels derived from steps (ii) and (iii); (v) a second interferometric profiling step at a second magnification M2, wherein M2>M1, wherein only selected regions of the sample surface are analysed, said selected regions comprising the features associated with the (X,Y)-coordinates of the pixels in the Low Magnification Frame File; and further comprising a step selected from: (vi) analysing the output of the second interferometric profiling step to differentiate between an intrinsic defect and an extrinsic defect; (vii) assessing whether said sample surface meets one or more quality control standard(s) and/or one or more target property or properties; and (viii) assessing
(Continued)

whether said sample surface is suitable as a surface for subsequent coating.

35 Claims, 5 Drawing Sheets

(51) Int. Cl.
    *G01B 11/24*     (2006.01)
    *G01B 9/02*     (2006.01)

(56) References Cited

U.S. PATENT DOCUMENTS

| | | |
|---|---|---|
| 5,953,124 A | 9/1999 | Deck |
| 5,986,760 A | 11/1999 | Nakayama |
| 5,987,189 A | 11/1999 | Schmucker |
| 5,991,461 A | 11/1999 | Schmucker |
| 6,449,048 B1 | 9/2002 | Olszak |
| 6,624,893 B1 | 9/2003 | Schmit |
| 7,024,031 B1 * | 4/2006 | Castellanos-Nolasco G01N 21/95684 250/559.16 |
| 7,605,925 B1 | 10/2009 | Chen |
| 8,275,573 B1 | 9/2012 | Schmit |
| 2003/0076989 A1 * | 4/2003 | Maayah ................ G06T 7/0004 382/145 |
| 2008/0068613 A1 | 3/2008 | Kuchel |
| 2009/0018786 A1 | 1/2009 | Munteanu |

OTHER PUBLICATIONS

International Search Report for International Application No. PCT/GB2013/052455 dated Jan. 7, 2014.

Takeda, M., et al., "Fourier-transform method of fringe-pattern analysis for computer-based topography and interferometry," Jan. 1982, pp. 156-160, vol. 72 (1), Journal of the Optical Society of America.

Schmit, J., et al., "Extended averaging technique for derivation of error-compensating algorithms in phase-shifting interferometry," Jul. 1, 1995, pp. 3610-3619, vol. 34 (19), Applied Optics.

\* cited by examiner

METROLOGY METHOD

This application is a National Phase filing of International Application No. PCT/GB2013/052455, filed 19 Sep. 2013, and claims priority of GB Application No. 1216722.7, filed 19 Sep. 2012, the entireties of which applications are all incorporated herein by reference for all purposes.

FIELD OF THE INVENTION

The present invention is directed to interferometric profilometry for surface characterisation, and in particular to an improved method for the rapid characterisation of large areas of a surface.

BACKGROUND OF THE INVENTION

Interferometry is a non-contact method of measuring surface profile and interferometric profilers have become widely used instruments for analysis and quality control in a range of industries. Several techniques have been developed for calculating surface topography from optical interference data.

Phase-shifting interferometry (PSI), for example, is based on changing the phase difference between two coherent interfering beams at a single wavelength ($\lambda$) (or a narrow bandwidth of wavelengths) in a known manner, for example by changing the optical path difference (OPD) either continuously or discretely with time. Several measurements of light intensity with different OPD values, usually equally spaced, at a pixel of a photodetector can be used to determine the phase difference between the interfering beams at the point on a test surface corresponding to that pixel. Based on such measurements at all pixels with coordinates (x,y), a phase map $\varphi(x,y)$ of the test surface can be obtained, from which very accurate data about the surface profile may be obtained using well known algorithms. Many algorithms have been developed in the art for calculating surface topography from optical interference data (U.S. Pat. No. 2009/0018786-A1). PSI provides a vertical resolution on the order of 1/1000 of a wavelength or better; thus, it is well suited for characterizing smooth, well-reflecting surfaces. At the same time, the PSI technique has a limited vertical range of application because of the so-called $2\pi$ ambiguity; i.e. the fact that the phase shift between two beams is repeated with $2\pi$ periods every time the OPD exceeds a distance of $\lambda/2$. This "phase wrapping" behaviour of PSI leads to ambiguity in the measurements of the surface profile when the surface features are higher than $\lambda/2$. Thus, in practice, conventional PSI techniques are generally best-suited to measurements of fairly smooth and continuous surfaces because only in such cases can phase-unwrapping algorithms be applied to reconstruct the surface shape.

Large-step, rough, or steep-surface measurements, on the other hand, have been traditionally carried out with white-light (or broadband-light) vertical-scanning interferometry (VSI). As conventionally implemented, VSI uses a white-light source and the reference arm of the interferometer is scanned vertically with respect to a stationary test sample (or vice versa). In VSI, the degree of contrast of fringes produced on the detector by two interfering beams (instead of their phases) is measured as a function of distance between the reference and test surfaces to obtain information about the test surface. The contrast of a VSI interferogram is maximum when the OPD approaches zero and the test surface topography may be reconstructed by determining the peak position of the envelope of the interferogram for each detector pixel. The VSI approach overcomes the limited scanning range associated with PSI techniques, but suffers from significantly lower resolution (about 3 nm) and, therefore, is not as precise as PSI.

Together, PSI and VSI make it possible to measure most samples, although there may remain difficulties with measurement of samples that combine smooth surfaces with large profile gradients. Measuring the profile discontinuities of such samples requires the large scanning range of VSI, while characterizing a smooth surface texture requires a PSI resolution. This problem has been recently addressed by the development of an enhanced VSI algorithm (referred to as EVSI) that combines both PSI and VSI, as well as high-definition VSI (referred as HDVSI), as disclosed in U.S. Pat. No. 7,605,925, the disclosure of which is incorporated herein by reference.

One of the problems with conventional PSI and VSI techniques is that the sample scanning and data acquisition steps are very time-intensive. For instance, the measurement of a surface of polymeric film having dimensions of 32 cm×32 cm at a sufficiently high resolution (for instance at ×50 magnification) would take very many days, which is prohibitively long for most applications.

It is for this reason that conventional methods of interferometric surface characterisation have scanned only a fraction of the sample surface at isolated and effectively random locations, and then averaged the surface topography over that selected set of small surface areas. The resulting topographical characterisation is therefore extrapolated from selected locations and merely representative of the surface, rather than a true quantification of the surface topography of the sample.

This is a particular problem for polymeric films, as opposed to a machined metallic surface for instance. Surface features in polymeric films result either from irregularities in the polymeric material from which the film is made, or from the processes used in their manufacture, or from extrinsic material deposited on the film surface during film manufacture, processing or storage, or from combinations thereof. The surface features in polymeric films are therefore typically random and irregularly spaced, and so quantification of the surface topography of a commercially relevant area of the film surface has greater value, for instance in research and development of new film applications and in quality control, than an extrapolation from isolated and random locations.

It would be desirable to be able to topographically quantify the entire surface of a large area of sample surface at high resolution and in a speed-efficient manner.

It would also be desirable to be able to topographically characterise the dominant surface features of a sample surface in a precise, accurate and absolute manner at high resolution.

SUMMARY OF THE INVENTION

According to the present invention, there is provided an interferometric method for profiling the topography of a sample surface, comprising the steps of:
  (i) a first interferometric profiling step in which a sample surface is analysed by single-frame interferometry (SFI) at a relatively low first magnification M1 to produce a map comprising pixels with planar (X,Y)-coordinates corresponding to the area of the sample surface,
  (ii) interrogating the pixel data obtained from the first profiling step by identifying pixel(s) which meet or exceed a Cut-Off Threshold, and which also meet or exceed a parameter $N_{NAP}$ which is the number of adjacent pixels all of which meet or exceed the Cut-Off Threshold;

(iii) interrogating the pixel data obtained from the first profiling step by identifying pixel(s) for which no z-coordinate has been recorded;

(iv) generating a Low Magnification Frame File (LMFF) which comprises, and preferably consists of, the (X,Y) coordinates of the pixels derived from steps (ii) and (iii);

(v) a second interferometric profiling step in which the sample surface is analysed at a relatively high second magnification M2, wherein M2>M1, wherein only selected regions of the sample surface are analysed at said second magnification M2, wherein said selected regions comprise the features associated with the (X,Y)-coordinates of the pixels in the Low Magnification Frame File.

DETAILED DESCRIPTION OF THE INVENTION

Figure 1A:
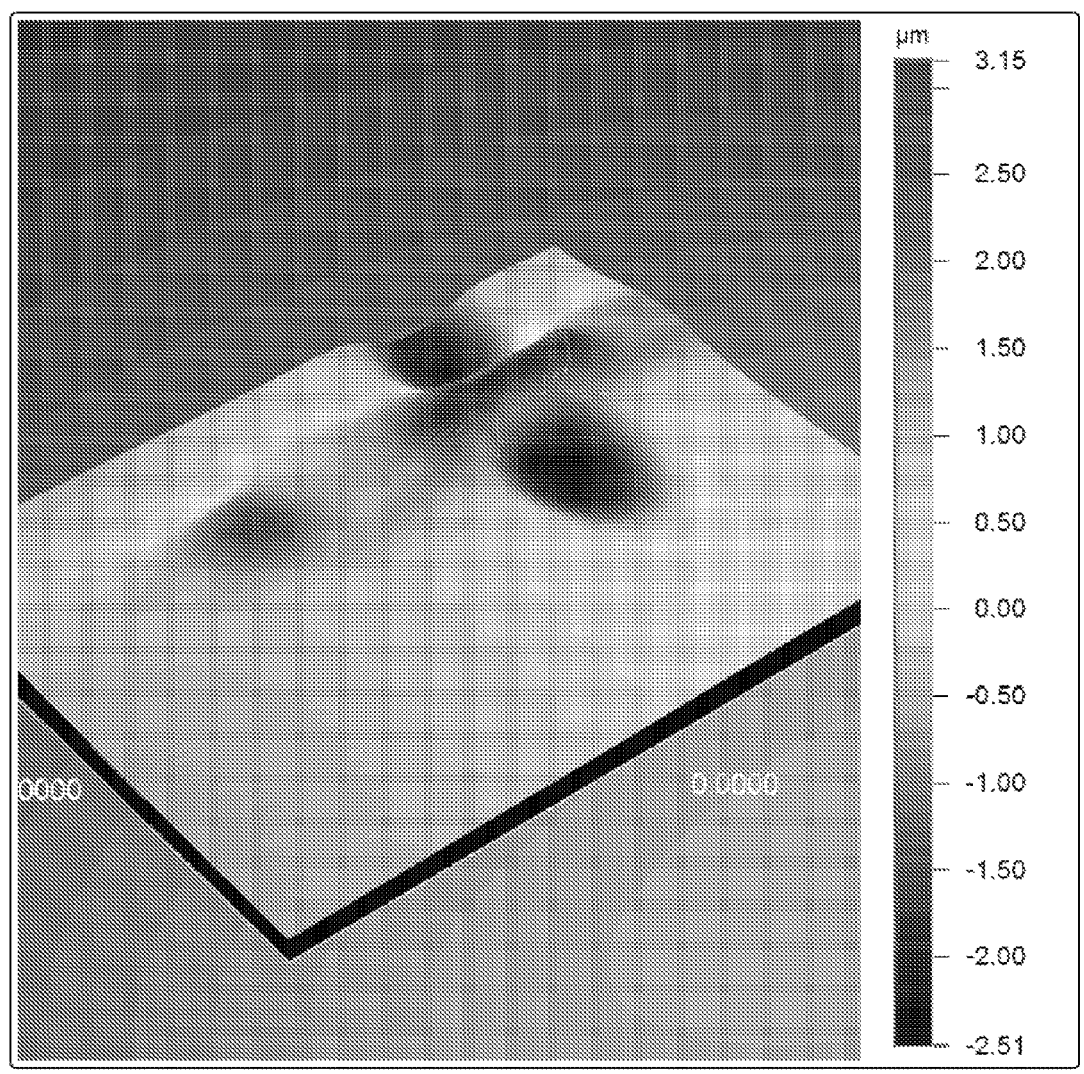
FIG. 1A depicts pinch-point defects, of the surface of a polymeric film.

The principle underlying the present invention is that the first, low-magnification profiling step allows the identification of the areas of the sample surface which are of most topographical significance for a full and accurate characterisation of that surface. Thus, the first profiling step pinpoints the regions of most interest but outputs only a low-resolution characterisation of the surface. In the second, high-magnification step, only those regions of most interest identified in the first step are revisited and then characterised at high-resolution. Thus, the present invention allows the quantification of the surface topography of a commercially relevant area of a sample surface, rather than an estimation of the surface topography extrapolated from isolated and effectively random fractions of that surface. The present invention achieves a dramatic reduction in the speed at which a sample surface can be characterised for topographically relevant features at high resolution. For instance, the time taken to characterise the topographically significant features of a 35×35 cm$^2$ sample surface is reduced from over 48 hours to less than 3 hours.

Surface features in polymeric films may either be considered as undesirable defects, or as designed topographical features (such as surface roughness imparted to the film via the introduction of a filler material in order to modify the film properties, such as the film's handling). For ease of reference, the term "defect" is used herein to refer to both undesirable defects and designed topographical features.

The following technical definitions are used in the methods of the present invention and/or are conventional in the art of interferometry.

Extrinsic and Intrinsic Roughness or Defect: As used herein, the term "extrinsic" roughness refers to roughness resulting from air-borne debris and/or handling damage which a surface of an article may suffer during storage and/or transport. Thus, extrinsic roughness has origins disconnected from the materials of the article. As used herein, the term "intrinsic" roughness refers to roughness which is present in the surface of the article itself. Thus, intrinsic roughness arises from some feature that is an inherent part of the article, for example in polymer films an intrinsic defect can arise from an embedded filler, aggregate or over-size particle, or a coating gel (an intractable cross-linked polymer region), and the like. Extrinsic defects on the surface of a polymeric film are typically irregularly shaped features having positive topography (i.e. features which are above the mean surface level of the film) with substantially no negative topography (i.e. features which are below the mean surface level of the film).

Shape: As used herein, the "shape" of a defect or surface feature refers to the three-dimensional shape of the feature in one or more of the x, y and z-dimensions, i.e. the lateral dimensions of the feature, the height(s) of the feature, and the slope(s) of the feature.

Pixel: A pixel is the minimum primitive unit size. In addition to its (x,y) position, the only information associated with each pixel is a single height (z or, when transformed $z^T$). Thus, whilst topography on a scale finer than the pixel dimension may be discernible at higher magnification (or by other instruments such as AFM), the z or $z^T$ value determined by a profiling step in the method of the present invention is a single optically derived average over that pixel dimension.

Optical path difference (OPD) file: This is the smallest rectangular pixel array measured or acquired as one entity in the SFI profiling step described herein. For instance, a 640×480 pixel array was used in this work. Thus, an OPD file is the parcel of pixels obtained via the SFI method which corresponds to the pixel array obtained by a PSI or VSI method.

Optical path difference (OPD) frame: An OPD frame contains one or more (typically more than one) adjacent OPD file(s). Each OPD file abuts its contiguous neighbour. Preferably, an OPD frame comprises a plurality of OPD files which are arranged end-to-end in either the x or y direction (typically in the y-direction and arranged as a column), in which one dimension (typically the x-dimension) of the OPD file is the same as the corresponding dimension in the OPD frame. A single focal length is used to collect the data within each OPD frame, which is achieved using an autofocus routine by the interferometer. Once data from each OPD frame have been collected, the interferometer refocusses. The size of the OPD frame (and the number of OPD files it contains) is typically dependent on the surface roughness or quality of the film; thus, small OPD frames are used for films of poor quality and/or having high surface roughness, which require frequent refocusing. Thus, an OPD frame typically comprises a single column (or row, depending on the direction of scanning) of OPD files, which is scanned by the interferometer at a single focal value.

Modulation Threshold (MT): Modulation threshold is an important user-defined parameter of an interferometric profiling instrument, and is usually expressed as a dimensionless percentage. The MT is a parameter which is defined by the user for the data acquisition stage (which results in a raw data file), rather than a parameter which is defined by the user during the processing of that raw data. Effectively, the MT sets the threshold on the level of signal and noise that the instrument allows through. Thus, a low MT (for example, 0.1-0.2%) allows more data and more noise, and so very little data is 'lost' but this is compromised by poorer signal to noise (S/N) and hence a deterioration in the precision of the data. In contrast, a relatively higher MT level (for example 10%) will admit very little noise and enhances precision, but more data could be lost, including genuine defects. In the first, low magnification profiling step of the method described herein, the MT is preferably set at a low level (for example 0.1 to 2%, and typically about 1%), i.e. noisy data are acceptable, because the second step of the method revisits all pixels associated with relevant topographical features or data-loss regions.

Data-Loss: Data-loss refers to one or more pixel regions where no height information is recorded for that pixel. Typically, this is because the slope of a topographical feature is too high for optical recognition, i.e. reflected light cannot be captured by the CCD (charge-coupled device) detector, so that the critical detectable maximum slope between adjacent pixels is exceeded, i.e. the height difference between adjacent pixels is too great. However, data-loss can also be due to significant differences in the reflectance or refractive indices of adjacent areas of the sample surface such that one area reflects no light into the CCD detector. An example of this is an extrinsic defect on the sample surface, as opposed to an intrinsic defect in the film surface, as described further below. The refractive index (RI) effect may be driven by the real part of the RI, or the complex part (e.g. if the extrinsic defect were a carbon particle it would absorb light rather than reflect it). Thus, a data-loss pixel or region can be associated with an intrinsic defect (more rarely, and due to its extreme geometry or slope), an extrinsic defect (more typically, and due either to its extreme geometry or slope or to its RI, or a combination thereof) or just noise. Hence, the user's capability to filter out the noise fraction by judicious selection of the MT is an important aspect of an interferometric profiling instrument, and the methods described herein. Increasing the MT value will filter out features which have relatively higher surface slopes and/or relatively poorer reflectance, and hence focusses the acquired data-set on surface regions which have relatively lower localised surface slopes and/or greater reflectance. Thus, a high value for MT minimises the noise-derived data-loss regions but may also filter out genuine defects. The MT value in the first profiling step described herein may be the same as or different to that in the second profiling step.

Mean Plane: the mean plane (or centre-line average (CLA)) calculated for each OPD file is a plane that is determined by calculating an average of all the heights of the surface profile in the OPD file, dividing the profile such that there are equal volumes above and below the mean plane. The mean plane of each OPD file is used to generate a three-dimensional reference surface to which all points in the dataset are related. A polymeric film surface may not be perfectly flat, and often has lower frequency curvature and/or gentle undulating waviness across its surface; superimposed on any such curvature and/or waviness are the more pronounced and sharper surface roughness features with which the present invention is concerned. Calculation of the mean plane takes both such surface features into account.

Cut-Off Threshold: The Cut-Off Threshold (COT) is a user-defined parameter which defines a height (typically expressed in nm) above (or below) the mean plane of the sample surface. Pixels having a height less than the Cut-Off Threshold are discarded. Pixels having a height equal to or greater than the Cut-Off Threshold are considered as candidates for a defect, which can be a positive surface feature or "peak" (i.e. a distance equal to or greater than the COT above the mean plane) or a negative surface feature or "trough" (i.e. a distance equal to or greater than the COT below the mean plane). In order to capture as much surface topography as possible, the Cut-Off Threshold is normally set as low as practicable. The Cut-Off Threshold in the second profiling step is typically greater than that in the first profiling step.

Surface Slope: An important topographical parameter in interferometric profilometery is the X and/or Y slopes associated with a surface feature. Slope information may be expressed in a number of ways, for instance, as the maximum slope or the (arithmetic) mean slope of the feature. The maximum slope of the surface feature is the maximum gradient that it, or its tangent in the case of a curved profile, makes with a line parallel to the mean plane. The X and Y slopes are calculated by comparing the height of a pixel with the height of the next pixel, which is in the X-direction for the X-slope values and in the Y-direction for the Y-slope values. The slope calculation for the slope between adjacent pixels is:

$$\text{slope} = \frac{1}{d_0}|Z_{j+1} - Z_j|$$

where
$d_0$ is the lateral spacing of the profile points $Z_{j-}$; and
Z is the height of the data-point relative to the mean plane.

As noted above, reflected light is not captured by the CCD detector if the slope of a topographical feature is too high for optical recognition. Typically, the critical detectable slope between adjacent pixels corresponds to an angle of about 45° (i.e. a slope of 1). If the height difference between adjacent pixels is large enough to exceed that angle, then a data-loss pixel results. Conventionally, the data-loss pixel is the second pixel ($Z_{j+1}$).

The method described herein is suitable for large-area metrology of a sample surface. Reference herein to "large-area metrology" is intended to refer to the metrology of a commercially relevant area of a sample surface, in particular an area up to 60 cm×60 cm or 3600 cm², and in one embodiment an area up to about 35 cm×35 cm or 1225 cm².

The First, Low Magnification Profiling Step

In the SFI method of the first profiling step, the whole area of the sample surface (32 cm×32 cm) is scanned in a single-frame raster-type approach. The sample surface is moved (or translated) relative to the measuring objective, and in this respect the SFI method is distinct from PSI or VSI techniques in which the sample surface is kept stationary in the x, y and z dimensions. In the SFI method, the sample surface is tilted relative to the reference surface. Each OPD file provides a set of interference fringes spaced apart according to the optical path difference (OPD) introduced by the tilt. In the SFI method, each frame abuts its contiguous neighbour vertically and horizontally, such that there is no overlap in data acquisition from neighbouring frames. The SFI method does not therefore use the stitching routines for multiple sub-sets of data which are common in other interferometric techniques (see, for example, U.S. Pat. Nos. 5,987,189 and 5,991,461). The interferogram acquired in each OPD file is then digitised by an algorithm and converted into a planar pixel map having (x,y)-coordinates having a certain number of pixels. An SFI-type method is described in U.S. Pat. No. 6,449,048 (referred to therein as lateral scanning interferometry (LSI)), the disclosure of which is incorporated herein by reference. The SFI method used in the present invention is described in greater detail hereinbelow.

As used herein, the term "raster-type approach" is intended to include conventional raster scan patterns and serpentine scan patterns. In a preferred embodiment, a conventional raster pattern is used, i.e. acquiring a first OPD frame, then moving (or translating) the sample surface from left to right so that successive frames are acquired across the whole width of the sample surface, and then moving the sample surface to acquire a set of frames in the next row and again from left to right across the whole width.

In the SFI method, the instrument is normally re-focussed for each new frame.

In one embodiment, the magnification M1 used in this first profiling step is no more than about ×10, typically no more than about ×5 and in a preferred embodiment about ×2.5 or less. M1 is preferably at least about 1.5×.

The surface area scanned in each frame depends on the magnifying power of the objective lens in the detector. For instance, where M1 is ×2.5, each OPD file corresponds to a surface area (or field of view) of about 2.2 mm (height) × about 1.7 mm (width), which equates to a pixel dimension of about $(3.5\ \mu m)^2$ using an OPD file having a 640×480 pixel array. It should be noted that this pixel size does not necessarily correspond to the actual lateral resolution, which in this example would be poorer by about a factor of about 4 or 5.

Thus, in the first step, the whole area of the sample surface, which is typically up to about 60 cm×60 cm for instance, is divided into a set of frames, an interferogram is obtained for each OPD file of each frame, and the interferogram is then converted into a pixel map for each file. Each file comprises a set of pixels, each pixel having an (x,y)-coordinate and an associated pixel height, i.e. a (z)-coordinate. The z-coordinate corresponds to the height of the pixel, and hence the height of the topographical feature. The profile of a topographical feature in the direction orthogonal to the sample surface, e.g. a peak, is represented by the differences in height between a plurality of adjacent pixels.

The pixel maps for each file are then juxtaposed to build up a single digitised pixel map for the whole area of the sample surface. At this stage, the raw data normally remain associated with the OPD file. The raw data are then processed in two stages.

The first processing stage involves the calculation of the mean plane (for each OPD file) and the transformation of the set of pixel heights z(x,y) in the raw data set to a refined set of pixel heights $z^T(x,y)$. Thus, the method comprises establishing a polynomial best-fit to the overall surface area to define the lower frequency curvature and/or undulating waviness which represent unhelpful variations in the sample surface height due to a basic lack of flatness etc., i.e. the form of the surface which is not attributable to individual intrinsic or extrinsic defects. This best-fit is then subtracted from the raw data to provide the refined new data set $z^T(x,y)$. The effect of tilting the sample surface relative to the reference surface in the SFI step is also eliminated in this transformation.

The second processing stage involves interrogating the refined data set $z^T(x,y)$ to identify the location of surface features or defects. This second processing stage comprises the definition of two further parameters by the user, namely (i) the Cut-Off Threshold (COT) as defined above, and also (ii) a parameter $N_{NAP}$ which is the Number of Adjacent Pixels which are required all to satisfy the Cut-Off Threshold. The term "adjacent pixels" herein refers to pixels which share an edge, rather than only one corner. A pixel, or more usually a set of pixels (i.e. $N_{NAP}$ is at least 1 but is typically >1), is only counted as a defect if it satisfies both of these user-defined parameters.

Thus, the pixels may be categorised into three basic types:
(i) A pixel with an (x,y)-coordinate and a z-coordinate which satisfies (i.e. meets or exceeds) the cut-off threshold and the modulation threshold, and which represents a measured and detected surface topographical feature.
(ii) A pixel with an (x,y)-coordinate but a z-coordinate which satisfies the modulation threshold but does not satisfy the cut-off threshold. Such pixels represent regions where there is no significant or detectable surface topographical feature.
(iii) A pixel with an (x,y)-coordinate for which no z-coordinate has been recorded, and which is characterised as a "data-loss" pixel, as described above.

The second processing stage typically (and preferably) further comprises, normally as a penultimate step in the second processing stage, storing the (x,y)-coordinates of the features containing pixels of type (i) and (iii) above in the relevant OPD file. The (x,y)-coordinates for each OPD file are then mapped onto a universal set of (X,Y)-coordinates which span the entire area of the sample surface.

The second processing stage comprises, as the final output from the first profiling step, the generation of a Low Magnification Frame File (LMFF), which comprises positional data (preferably the (X,Y)-coordinates described above) over the entire area of the sample surface. The LMFF comprises, and preferably consists of pixels of types (i) and (iii) above. Thus, the LMFF contains information on:
(1) Defects represented by a pixel of type (i) above or a set of pixels in which the majority of the pixels are of type (i) above. Such pixels satisfy both the user-defined COT and $N_{NAP}$ parameters. These are typically "true" topographical features, e.g. peaks, which tend to correlate predominantly with the intrinsic defects defined herein.
(2) Regions represented by a data-loss pixel of type (iii) above or a set of data-loss pixels of type (iii) above. The user does not set a limitation on the Number of Adjacent Pixels for a region to qualify as a data-loss region. These pixels may be considered as "artificial" defects or peaks. The second processing stage of the raw data optionally further comprises the definition of a further parameter by the user, which is the Nominal Height of Data Loss (NHDL) regions (an arbitrary and artificial single height value well outside the scope of intrinsic defects for a given surface) which is then assigned to all pixels of that data-loss region. In this work, for instance, the NHDL was set at 30 μm. In one embodiment, the NHDL parameter is applied to regions wherein at least 90% of the pixels are data-loss pixels.

The LMFF presents a list of pixels corresponding to both the "true" defects (1) and the "artificial" data-loss regions (2), and does not discriminate between them for the purpose of the second, high magnification profiling step.

The Second, High Magnification Profiling Step

In the second, high-magnification profiling step, rather than re-visiting all pixels generated in the first step, the instrument revisits only those pixels which are topographically interesting or significant and pixels which are associated with data-loss, and ignores the remaining pixels, i.e. the second step revisits features in the LMFF data-set. Thus, only pixels of type (i) and type (iii) above are revisited in this second step. For sample surfaces characterised by isolated areas of surface roughness, such as polymer films, the number of topographically significant or data-loss pixels is a tiny fraction of the total number of pixels collected in the first step, typically less than about 0.0001% of the total number of pixels, and it is this ratio which underpins the ability of the present invention to characterise the whole of a sample surface at high resolution and high speed.

This second profiling step revisits some or all of the features of the LMFF data-set. In one embodiment, the second profiling step revisits all of the features in the LMFF. However, in a further embodiment of the methods of the present invention, the size of the LMFF is reduced so that the second profiling step revisits only some of the features in the LMFF data-set. For instance, the second profiling step may optionally comprise steps such as altering the Modulation Threshold (relative to that used in the first profiling step), and/or selecting a certain fraction of the identified features (such as a user-defined percentile or absolute number of features having the highest amplitude in terms of z-coordinate, e.g. the 50 highest peaks).

The second, high-magnification step may be conducted according to a conventional interferometric technique, such as those described hereinabove, and preferably by known PSI or VSI methods, or a combination of PSI and VSI. Interferometric techniques, and particularly PSI and VSI, including the data collection, optics, data processing, algorithms and equipment required to conduct the techniques, are well-understood by the person skilled in the art of surface profiling (see for instance U.S. Pat. No. 6,449,048). The PSI technique tends to be faster, as no vertical scanning takes place, and affords very high precision and resolution, but may be susceptible to data-loss if the surface features involve extreme gradients. The VSI technique is slower, by virtue of vertical scanning steps, but is better able to measure surface features with extreme gradients (which is of particular importance for the identification of extrinsic defects) although typically this is accompanied by a reduction in precision and resolution. An important feature of the VSI technique is that it can be readily combined with PSI, or other measurement techniques. For example, VSI and PSI techniques were combined in the systems described in U.S. Pat. Nos. 5,133,601 and 5,471,303, the disclosures of which are incorporated herein by reference. In one embodiment, the second profiling step comprises a VSI technique, and in one embodiment consists of a VSI technique. The choice of technique in the second profiling step depending on the height and slope of the defects (primarily the intrinsic defects) of the sample surface. For instance, VSI may be more appropriate when the defect includes a large step.

The magnification M2 used in the second step is preferably such that M2≥(2×M1), more preferably M2≥(5×M1), more preferably M2≥(10×M1), and more preferably M2≥(20×M1). Typically, M2 is at least ×20, and preferably at least ×50. Typically, M2 is no more than ×115, more typically no more than ×100.

The numbers of pixels in the pixel array will normally be the same in the first (low magnification) and second (high magnification) steps used in the method.

In the second, high magnification step, it is preferred that the field of view contains only a single defect or topographical feature. It is also preferred that the whole of the defect or topographical feature be within the field of view.

The claimed method typically also comprises the step of processing the data collected in the second profiling step by the definition of two further parameters by the user, namely (i) the Cut-Off Threshold (COT), and/or (ii) the Number of Adjacent Pixels ($N_{NAP}$) which are required all to satisfy the Cut-Off Threshold. The values of COT and $N_{NAP}$ in the second profiling step are, independently, the same as or different to the corresponding values used in the first profiling step. Typically, the COT of the second profiling step is greater than that used in the first profiling step. In a preferred embodiment, the value of $N_{NAP}$ in the second profiling step is set by the user as a function of the value of $N_{NAP}$ in the first profiling step such that the surface area covered by the number of adjacent pixels is substantially the same in the first and second profiling steps, taking into account the smaller pixel size at the higher magnification M2.

The output of the second profiling step is a detailed profile for each of the selected peaks in the LMFF.

As described above, the present inventors have found that the data-loss regions identified by the first profiling step are likely to correspond to extrinsic defects. This may be because of a difference in the optical properties (typically reflectance or RI) of the material(s) of the extrinsic defect relative to the optical properties (typically reflectance or RI) of the bulk polymer of the sample surface or, more likely, because extrinsic defects are typically proud of the surface (i.e. they are not embedded in the surface) and are therefore characterized by much larger surface slopes. Extrinsic defects may also be associated with a combination of differences in optical properties (typically reflectance or RI) and large surface slopes. However, the association of a data-loss region to an extrinsic defect from the data collected in the first profiling step is only a provisional association; the differentiation between extrinsic and intrinsic defects is completed by analysis of the data obtained in the second profiling step. If a region which was identified as a data-loss region in the first profiling step is also identified as a data-loss region in the second profiling step then, according to the present invention, such a region is indicative of an extrinsic defect.

As noted above, surface slopes above a critical threshold are associated with data-loss. Under high magnification (M2; as defined herein), an intrinsic defect may comprise one or more localised surface slope(s) which are sufficiently large to give rise to one or more data-loss region(s), wherein each region comprises one or more data-loss pixels. Because of differences in profile and localised surface slopes, certain intrinsic defects exhibit greater numbers of data-loss regions or pixels than other intrinsic defects. However, according to the present invention, an intrinsic defect is characterised by a set of pixels in which the number of data-loss pixels obtained under high magnification (M2) is small, relative to the number of all pixels which constitute that defect, particularly wherein the lateral extent of any data-loss region is relatively small. Thus, the dominant interferometric response of an intrinsic defect is a set of pixels for which X and/or Y slope is calculable between the majority of adjacent pixels.

In contrast, an extrinsic defect is characterised by a set of pixels in which the number of data-loss pixels obtained under high magnification (M2) is in the majority, relative to the number of all pixels which constitute that defect, i.e. a set of pixels for which X and/or Y slope is incalculable between the majority of adjacent pixels. An extrinsic defect is also characterised by a set of pixels wherein the lateral extent of a data-loss region is relatively large, and particularly wherein a majority of data-loss pixels form a contiguous region of data-loss pixels. Thus, the dominant interferometric response of an extrinsic defect is data-loss, for instance resulting from excessive surface slopes and/or a difference in optical properties (reflectance or RI) relative to the surrounding sample surface, with the result that X and/or Y slopes between adjacent pixels is incalculable.

As used herein, the term "lateral extent" of a data-loss region refers to the number of contiguous pixels in any one data-loss region. As used herein, the term "contiguous" refers to adjacent pixels which share an edge, rather than just one corner.

Usefully, an intrinsic defect can be defined as a defect in which the number of data-loss pixels is less than 50%, preferably no more than 25%, preferably no more than 10%, preferably no more than 5%, preferably no more than 1%, preferably no more than 0.5%, and preferably no more than 0.1%, of the total number of pixels collected for that defect under said high magnification (M2). Additionally, an intrinsic defect can usefully be defined by the lateral extent of any data-loss region associated with that defect, such that the number of contiguous pixels in any one data-loss region is less than 10, preferably less than 5, under said high magnification (M2).

Usefully, an extrinsic defect can be defined as a defect in which the number of data-loss pixels is at least 50%, preferably at least 75%, preferably at least 90%, preferably at least 95%, preferably at least 99%, preferably at least 99.5%, and preferably at least 99.9%, of the total number of pixels collected for that defect under said high magnification (M2). Additionally, an extrinsic defect can usefully be defined by the lateral extent of the data-loss region, such that the number of contiguous pixels in any one data-loss region is at least 10, preferably at least 50, preferably at least 100, preferably at least 1000.

Furthermore, the present inventors have found that intrinsic defects in polymer films are typically characterised by a mean slope in one or both of the X and Y directions of no more than 1.0, more typically no more than 0.5, and more typically no more than 0.3.

Figure 4:
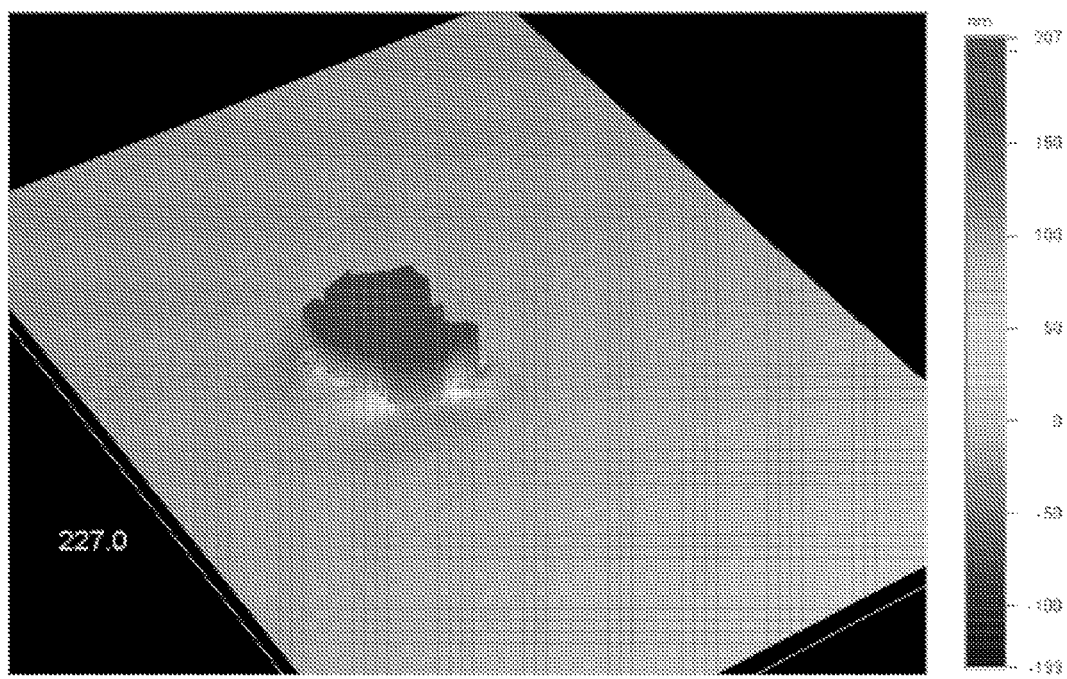
FIG. 4 depicts the surface of a polymeric film having a defect described by a data-loss region of irregular shape.

Furthermore, the present inventors have identified a further general characteristic of an extrinsic defect which is that the defect as described by the data-loss region is irregular in shape, as illustrated in FIG. 4 herein.

The definitions involving data-loss pixels of intrinsic and extrinsic defects immediately herein above are of particular utility when M2 is at least 20×.

The present invention therefore provides a method of differentiating intrinsic defects from extrinsic defects via analysis of data-loss pixels associated with the defect. Thus, the method of the present invention preferably further comprises the step of analysis of the output of the second interferometric profiling step in order to differentiate between an intrinsic defect and an extrinsic defect, wherein said analysis comprises analysis of the data-loss pixels associated with a defect. Preferably, said analysis comprises analysis of one or both of:
  (i) the number of data-loss pixels relative to the total number of pixels collected for that defect under said high magnification (M2), and
  (ii) the lateral extent of any data-loss region associated with that defect.

Thus, the interferometry method of the present invention is able to differentiate between extrinsic and intrinsic defects on the basis of one or both of:
(i) the shape of the defect; and
(ii) the optical properties of the defect.

Figure 1B:
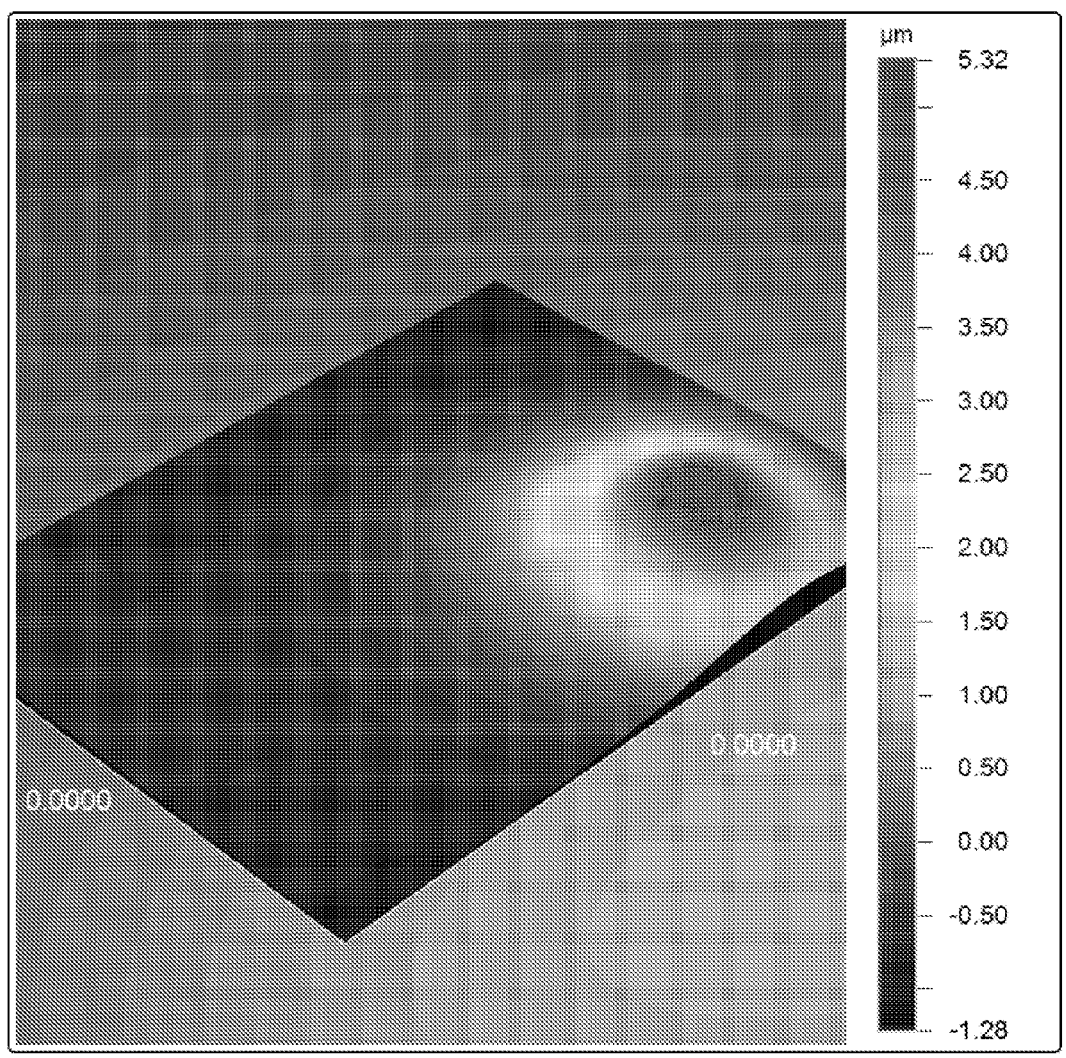
FIG. 1B depicts smooth circular defects of the surface of a polymeric film.
Figure 2:
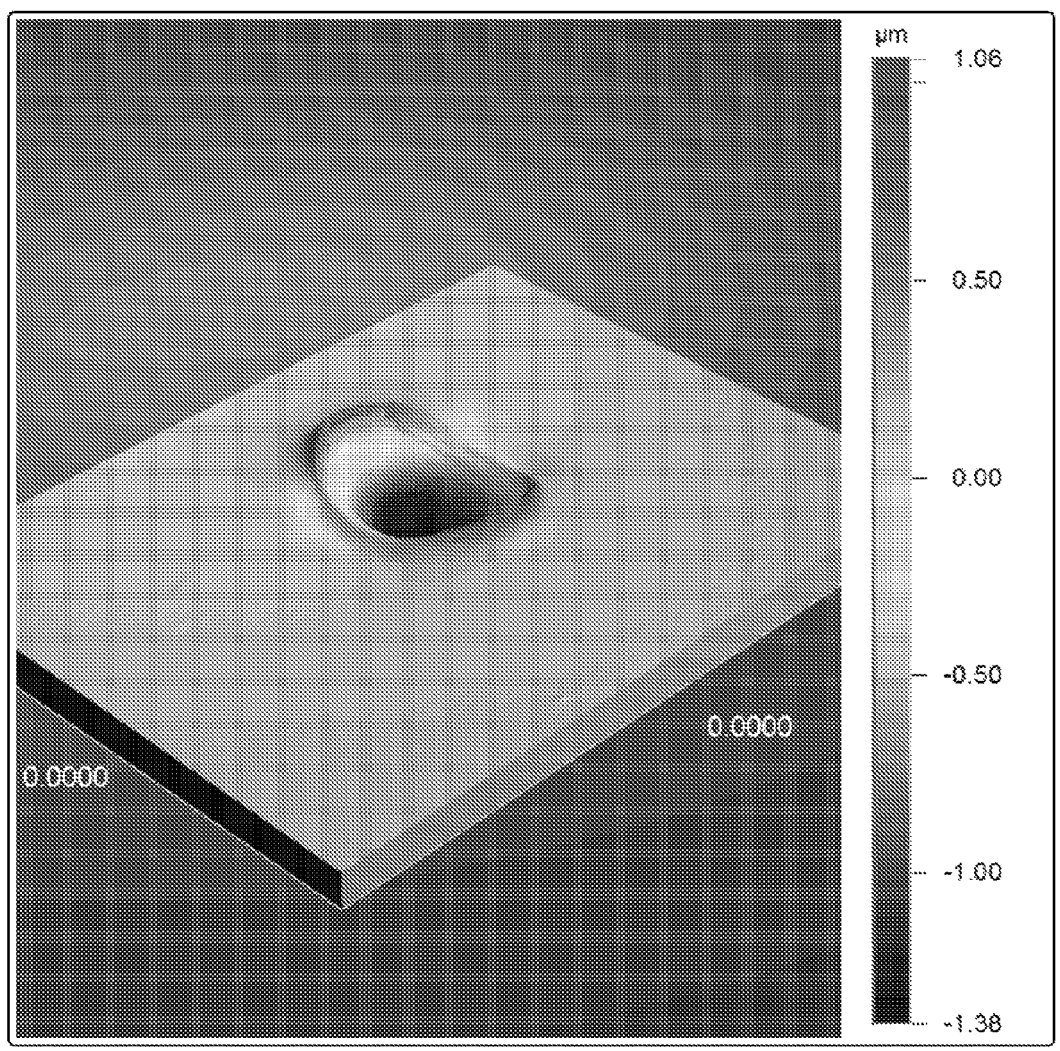
FIG. 2 depicts depressions of the surface of a polymeric film.
Figure 3:
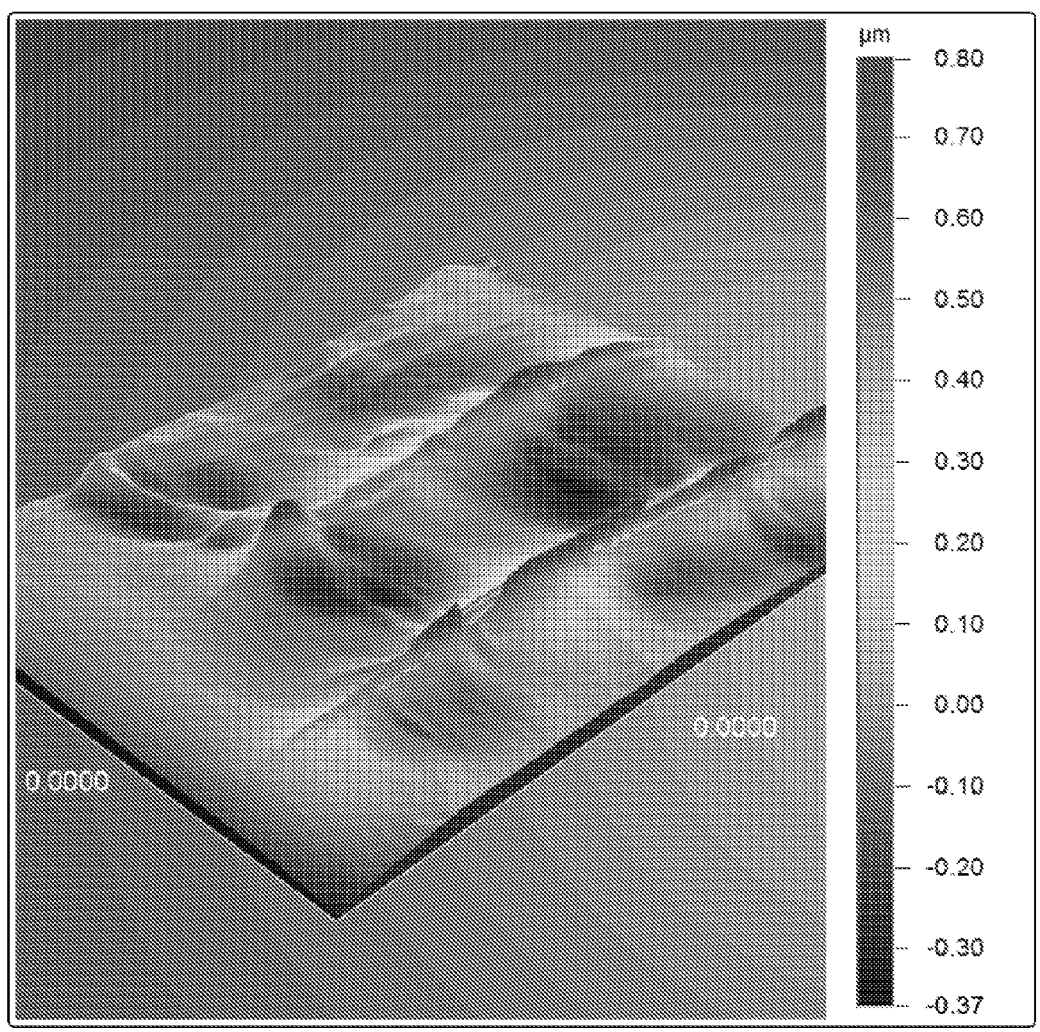
FIG. 3 depicts gel-like features or streaks on the surface of a polymeric film.

The present inventors have been able to categorise intrinsic defects of the surface of a polymeric film as follows:
  (1) Defects caused by inclusions within the polymer substrate, which can be caused by the presence of, for instance, fillers, crystallites, degradants (typically degraded polymer, but also including degradation products of other starting materials) and gels (typically regions of intractable polymer (for instance, cross-linked, branched or degraded polymer) having a molecular weight or rheology different to the bulk polymer matrix), and which can be categorised as "pinch-point" defects and "smooth circular" defects:
  (a) Pinch-point defects are characterised by a crater either side of a central peak (see FIG. 1A). It is believed that such defects are caused by inclusions which reside relatively near the surface of the substrate, which generate greater localised stress/strain regions during the stretching steps of film manufacture.
  (b) Smooth circular defects are characterised by a central peak with no crater (see FIG. 1B). It is believed that such defects are caused by inclusions which reside relatively deeper within the substrate
  (2) Depressions are characterised by a central crater, sometimes associated with raised areas around the crater (see FIG. 2).
  (3) Gel-like features or streaks are characterised by globular surface features or elongated regions of raised ridges sometimes associated with shallow valleys either side of the ridge (see FIG. 3). The inventors believe such defects result from extrusion events, such as die-lip edge flow disturbances and extruded degraded polymer.

The topographical analysis yields information which can be used to characterise the sample surface in terms of a number of criteria, for instance such as those described below, wherein the vertical amplitude (i.e. peak height or trough depth) is measured relative to, and orthogonal to, the mean plane:
  (i) The number ($N_{DT}$) of all defects with a vertical amplitude within a given range, for instance from about 0.25 µm to about 30 µm, for a given area of sample surface.
  (ii) The number ($N_{PP}$) of pinch-point peaks with a vertical amplitude within a given range, for instance from about 0.25 µm to about 30 µm, for a given area of sample surface.
  (iii) The number ($N_{GS}$) of gel-like features or streaks with a vertical amplitude within a given range, for instance from about 0.25 µm to about 30 µm, for a given area of sample surface.
  (iv) The number ($N_E$) of extrinsic defects for a given area of surface, or the number of extrinsic defects having a defined characteristic, such as a minimum lateral dimension of greater than a pre-determined size (e.g. 7 µm), for a given area of sample surface.
  (v) The number of features having mean or maximum X and/or Y slopes which are equal to or greater than a pre-determined level (typically, for instance, 1.0, 0.9, 0.8. 0.7, 0.6, 0.5, 0.4 or 0.3), for a given area of sample surface.

The method of the present invention is useful for assessing the suitability of a sample surface for a subsequent coating step, particularly a conductive coating or barrier coating or other coating which is required to exhibit a high degree of smoothness. Thus, in a further aspect, the invention provides a screening method for assessing the suitability of a sample surface film for subsequent coating. Said method comprises the steps of the interferometric method described herein, and further comprises the steps of interrogating the data obtained therefrom (for instance comprising the application of one or more of criteria (i) to (v) defined above, and particularly comprising the application of criterion (iv) or (v), particularly criterion (iv)), and accepting or rejecting the surface as suitable for subsequent coating.

In order to be suitable for such a subsequent coating step, for instance, it is preferred that a surface satisfies one or more of the following criteria:

(i) The number ($N_{DT}$) of all defects with a vertical amplitude, orthogonal to the mean plane, of from about 0.25 µm to about 30 µm is no more than 1000, preferably no more than 750, preferably no more than 500, preferably no more than about 400, preferably no more than about 300, preferably no more than 200, preferably no more than 100, preferably no more than 75, preferably no more than 50, and preferably no more than 25, per (1023) cm$^2$ of surface.

(ii) The number ($N_{PP}$) of pinch-point peaks (1 a) with a peak height of from about 0.25 µm to about 30 µm is no more than 100, preferably no more than 80, preferably no more than 70, preferably no more than 60, preferably no more than 50, preferably no more than 40, preferably no more than 30, and preferably no more than 20, per (1023) cm$^2$ of surface.

(iii) The number ($N_{GS}$) of gel-like features or streaks (3) with a peak height of from about 0.25 µm to about 30 µm is no more than 10, preferably no more than 5, preferably no more than 2, and preferably zero, per (1023) cm$^2$ of surface.

(iv) The number ($N_E$) of extrinsic defects per (1023) cm$^2$ of surface, and in one embodiment the number of extrinsic defects having a minimum lateral dimension of greater than 7 µm, is no more than 30, preferably no more than 20, preferably no more than 10.

(v) The number of features having a maximum X and/or Y slope which is equal to or greater than 0.3 is no more than 10, preferably no more than 5, preferably no more than 3, preferably no more than 1, per (1023) cm$^2$ of surface.

The method of the present invention is also useful for determining whether a sample surface meets one or more quality control standard(s) and/or one or more target property or properties. Thus, in a further aspect, the invention provides a method of determining whether a sample surface meets one or more quality control standard(s) and/or one or more target property or properties. Said method comprises the steps of the interferometric method described herein, and further comprises the step of interrogating the data obtained therefrom to compare against one or more quality control standard(s) and/or one or more target property or properties, which may optionally be selected from one or more of criteria (i) to (v) defined above (and particularly criterion (iv) or (v), particularly criterion (iv)), and further comprises the step of accepting or rejecting the surface.

The methods described herein are preferably conducted using a range of objectives having magnifications of from ×1.5 to ×115, including ×1.5, ×2.5, ×5, ×20, ×20, ×50, ×100 and ×115, and in one embodiment using a range of objectives having magnifications of from ×1.5 to ×50. The objectives may be used in conjunction with a field of view magnifier, typically up to about ×2.

The methods described are preferably conducted using a Wyko® SP9900 optical surface profiler (Veeco Instruments Inc; Bruker Corporation).

The methods of the present invention may comprise further analytical steps to characterise the film surface, particularly to differentiate between extrinsic and intrinsic defects, which employ additional analytical techniques. Thus, the method of the present invention may further comprise, for instance, compositional analysis of a defect. In conducting such further analytical techniques, it may be necessary to place a fiducial marker or set of fiducial markers on the sample as a reference point, in accordance with conventional techniques in imaging technology. The test sample is analysed by re-visiting the identified defects at the known (X,Y)-coordinates of the sample surface using one or more additional analytical technique(s), such as optical microscopy, scanning or transmission electron microscopy (SEM or TEM) or other scanning probe microscopy (such as atomic force microscopy (AFM) or scanning tunnelling microscopy (STM)), and/or compositional or elemental analysis (for instance by X-ray photoelectron spectroscopy (XPS) or energy-dispersive X-ray spectroscopy (EDX), typically in combination with SEM or TEM, or using secondary ion mass spectroscopy (SIMS).

The methods described herein are of particular utility in analysing the surface topography of thin polymer films, particularly polyester films. As used herein, the term "thin" polymer films refers to films less than 750 µm, preferably less than 500 µm. Such polymer films, and particularly polyester films, are typically oriented, more typically biaxially oriented, and are dimensionally stabilised by heat-setting and optionally also by a thermal relaxation stage conducted under a tension and temperature regime which is lower than that of the heat-setting step, as is well-known in the art (see, for instance, WO-03/087247-A). The polyester of the film is typically a homopolyester of polyethylene terephthalate or polyethylene naphthalate, but the present invention is applicable to copolyesters based on these preferred polyesters, as well as other polyesters and copolyesters.

The advantageous mechanical properties, dimensional stability and optical properties of such films are well-known. These properties have led to the use of biaxially oriented polyester films in electronic and opto-electronic devices including electroluminescent (EL) display devices (particularly organic light emitting display (OLED) devices), electrophoretic displays (e-paper), photovoltaic cells and semiconductor devices (such as organic field effect transistors, thin film transistors and integrated circuits generally), particularly flexible such devices. Other applications include the provision of optical films, medical devices and decorative films.

For these and other applications, it is sometimes necessary to provide a very smooth and flat surface for the further processing of the polyester film, for instance to ensure the integrity of subsequently applied coatings, such as a conductive coating or a barrier coating, in order to avoid breaks or pin-pricks therein. A barrier layer provides high resistance to gas and/or solvent permeation, and is typically applied in a sputtering process at elevated temperatures. A conductive layer, for instance, indium tin oxide (ITO), used in the manufacture of flexible electronic or opto-electronic display devices may be disposed on a film substrate via a sputtering technique, and non-uniformity in the substrate surface can cause non-uniformity and/or discontinuities in the conductive layer, resulting in for example non-uniform conductivity or pixel yield problems, depending on the type of electronic device.

It is known to reduce defects in layers subsequently applied to a substrate by the provision of an intermediate planarising layer, as taught in WO-03/087247-A for instance. An alternative approach is to provide strippable sacrificial protective layers which are easily peelable from a substrate surface, in order to protect that surface from damage, contamination and/or debris during storage or transport. The sacrificial layers are then stripped from the substrate to leave a clean surface immediately prior to the further processing or installation of the substrate. The ability to differentiate between extrinsic and intrinsic defects for the purposes of quality control and product development is of critical importance for such polymer films.

The interferometric method described herein, and in particular the first interferometric profiling step, profiles a sample surface with single-frame spatial-carrier irradiance measurements and a predetermined processing algorithm. The following discussion describes in more detail the practice and protocol of the interferometry techniques described herein, and in particular a preferred protocol for the SFI step of the present invention. In particular, the following discussion describes a preferred protocol for rapidly identifying defects on a large sample surface using an adaptive algorithm and single-frame interferometric data. In order to speed up the measurement and produce meaningful results rapidly when a large sample surface is involved, the present invention adopts a single-frame raster-type approach for scanning the surface and a spatial carrier method of analysis for processing the interferometric data collected during the scan. By introducing a tilt between the sample surface and the reference surface, each frame provides a set of fringes spaced apart according to the OPD produced by the tilt. If the sample surface were sufficiently flat to produce a reasonably uniform spacing between fringes, each frame could be analysed using conventional PSI or Fourier Transform (FT) algorithms. For instance, when the tilt in the surface corresponds to fringes produced by a 90° phase change between adjacent detector pixels (the spatial phase step), a conventional 90° PSI algorithm applied to consecutive pixels may be used effectively to profile the surface and identify defects. Any discontinuity in the fringes will correspond to a discontinuity in the smooth surface profile (i.e., a defect) that can thus be identified and measured using the conventional temporal PSI algorithm. A similar analysis can be carried out with standard FT algorithms (see, for example, Mitsuo Takeda et al., "*Fourier-transform method of fringe-pattern analysis for computer-based topography and interferometry*," JOSA, Vol. 72, Issue 1, pp. 156-160).

Inasmuch as the tilt between a smooth surface and the reference surface can be controlled to produce the desired spatial phase step to match a particular algorithm selected for analysis, this single-frame approach is theoretically sound for finding defects rapidly and fairly accurately in large surface areas using conventional PSI or FT algorithms. However, all PSI algorithms are based on the information provided by a fixed number of consecutive irradiance data points acquired during the scan (at least three for sensitivity; typically five or eight). The most appropriate algorithm is selected according to the phase step expected between data points and a constant phase step is assumed.

As a result of the multiple data points used, PSI-type algorithms tend to smooth the phase information produced from the data acquired from the sample and the smoothing effect is greater when a larger number of points is used. This effect is even more pronounced with FT algorithms. Therefore, surface defects that involve very small areas, such as spots corresponding to one or two pixels of the detector, may be smoothed out and remain undetected if the wrong PSI algorithm is used with single-frame spatial-carrier data. Furthermore, even if the correct algorithm is selected for the particular defects expected to be found in a given sample, the effectiveness of the algorithm, which is founded on the presumption that fringes are produced by a constant phase step that is known a priori, may be undermined by slope variations normally present in the sample surface. Therefore, an unacceptable defect may go undetected or may be overlooked for further evaluation because the PSI algorithm is ineffective for the local changes in phase step size even though appropriately selected for the size of the defect.

Thus, while conventional single-frame spatial-carrier measurements are rapid and very advantageous for measuring large objects, they are less preferred for defect detection in large samples that are not perfectly flat. The protocol described hereinbelow is therefore a preferred protocol for the interferometric described hererin, and the SFI step in particular.

Thus, the single-frame spatial-carrier method of the preferred protocol is based on the use of an adaptive algorithm tailored to fit the local spatial fringe frequency of the data being processed. As a result, the best form of algorithm is used at each step of the calculation to ensure an accurate local measurement. Thus, if the selected algorithm is appropriate to avoid smoothing of the defects expected to be found in the sample, such defects are identified even when the sample surface is not flat and its slope does not conform to the tilt introduced for the measurement. Once so identified, the defects are measured again locally with greater accuracy by conventional vertical-scan (temporal) PSI. The sample surfaces with which the present invention is particularly concerned, namely polymeric films are not perfectly flat and tend to comprise defects of a nature and size within generally known parameters. Therefore, it is possible to select a suitable algorithm that utilizes a number of data points that is large enough to see the defect but not so large as to hide it by its smoothing effect. The selection of such suitable algorithm is not part of the normal process of conventional PSI analysis because in temporal PSI the smoothing effect of the algorithm does not affect lateral resolution. However, it is important for resolution in spatial PSI.

As is conventional for spatial-carrier interferometry, the angle between the large sample surface and the reference mirror is set to the degree necessary to produce the best average spatial frequency for the PSI algorithm selected for the measurement. The surface is then scanned, preferably in raster fashion for speed and coverage, to acquire multiple single-frame interferograms. The data points of each interferogram are used in conventional manner to profile the corresponding surface section using the selected algorithm, thus rapidly identifying unexpected irregularities that may correspond to defects. Each set of data points (or a representative sample thereof) used sequentially by the algorithm is first processed with a Fourier Transform (or any other equivalent method, such as a fringe counting method or one of the various spectral methods well documented in the literature, like MUSIC® or ESPRIT®, for example) in order to find the local frequency of the fringes being analysed. That information is then used to adapt the PSI algorithm to the correct phase step thus calculated, thereby optimizing the efficiency and precision with which the selected algorithm profiles the local surface area. As a result, defects are identified even when the slope of the surface varies locally to the point where the algorithm without adaptive modification is less effective in measuring them.

The adaptive modification of the preferred protocol is based on the recognition that conventional PSI algorithms are not optimised to cope with continuously variable fringe frequency and thus they are prone to produce incorrect surface characterization. In essence, together with the dynamic frequency determination, the preferred protocol utilises an optimal procedure for building the best PSI-like algorithm corresponding to a given frequency in the data being processed.

The principle underlying the preferred protocol is the modification of the PSI algorithm used for single-frame spatial-carrier analysis in order to adapt it to the local slope conditions of the sample surface. This optimizes the performance of the algorithm, which is tied to the spatial fringe frequency of the interferogram being measured, and therefore facilitates the detection of defects that may otherwise remain undetected. As a result, the single-frame approach becomes suitable for defect detection and its greater speed makes it possible to measure large samples in much more rapid fashion than with conventional vertical-scan (temporal) approaches (PSI or VSI). Once so identified, the more precise measurement of the defect is conducted using a conventional measurement (typically with a vertical scan) with data acquired via a local scan at the higher magnification, as noted hereinabove.

Thus, the preferred protocol may be undertaken with a conventional Z-scanning interferometer with an objective or a sample stage 14 capable of X and Y relative translation, such as in serpentine or raster fashion, to acquire images of adjacent portions of a sample surface. The interferometer comprises a light source illuminating a reference mirror and the sample surface through a microscope objective. A suitable mechanism is provided to vary the optical path difference of the beams to the mirror and the sample surface. Combining the light beams generated in reflection from the mirror and the sample surface, interference fringes are produced as a result of the optical path difference between the two beams generated by the vertical scan. A detector (typically a CCD camera) and appropriate electronic components are provided to acquire and transmit digitized irradiance data and for further processing.

The conventional interferometer is typically equipped with a sample stage sufficiently large to accommodate the sample of interest and with an X-Y scanner adapted to cover the entire surface of the sample in some manner so that single-image data of the sample may be acquired. The interferometer is equipped with a tip/tilt mechanism to introduce a predetermined angle of incidence on the beam illuminating the sample surface so as to produce fringes of a certain frequency deemed optimal for the particular PSI algorithm used for analysis of the interferograms. It is understood that angle of incidence may be varied by tilting the optical head, the reference mirror, and/or the objective. Preferably, the interferometer is equipped with an automatic focusing mechanism to track the height changes of the sample surface as the objective scans it.

According to the preferred protocol, the sample is first scanned in the X-Y plane to acquire single-frame images of different portions of the surface at the relatively low magnification M1. The magnification used (and/or the numerical aperture of the objective, particularly in the case of very small defects) is determined based on the nature of the defects and the correspondingly required lateral resolution. Thus, based on a priori knowledge about the expected size of the defects to be encountered on the sample of interest, a PSI algorithm capable of identifying them with the available resolution is judiciously selected and used to analyse each interferogram frame acquired during the scan. For example, a five-point algorithm may be used for a presumed 90-degree phase-shift-per-pixel tilt. However, as mentioned above, local variations in the slope of the sample surface may change the fringe frequency to the point where the effectiveness of the chosen algorithm is impaired and materially incorrect results are obtained.

To overcome this difficulty, the preferred protocol calculates the spatial fringe frequency for each set of "N" data points being processed by the algorithm. This is done, for example, by using conventional Fourier Transform analysis. The fringe frequency so determined is then used to adapt the algorithm for optimal performance at that local frequency. This step is repeated on a recurring basis locally as the algorithm processes each new set of N data points in each correlogram being analysed. As a result, the algorithm maintains the degree of precision necessary to resolve small surface irregularities regardless of the actual local slope of the sample surface. Once such irregularities are identified by this initial, rapid scan, they are then measured at the higher magnification and a higher degree of accuracy by performing conventional Z-scan PSI (or VSI) only at the location of the defect, as described elsewhere herein.

The adaptive algorithm of the preferred protocol is developed as follows. The surface under investigation is slightly tilted with respect to the zero OPD position (determined by the reference mirror position), and a single snapshot of the interferometric signal coming from the sample and the reference mirror is recorded by a CCD camera. The profile of the sample can then be recovered conventionally by analysing the phase of the fringes produced by the tilt. The shape and frequency of the fringes is strongly dependent upon the tilt angle between the surface and the reference mirror as well as upon the shape of the surface itself. In the case when the surface is flat, linear fringes with constant frequency will be obtained on the CCD. In the case of a spherical surface, circular fringes with variable frequency are seen. In order to determine the surface profile at every point, the interference figure is preferably analysed in a direction perpendicular to the fringes.

Thus, the preferred protocol may be defined as follows:
1. Determine the direction perpendicular to the fringes seen in the interferogram. When the surface does not deviate much from planarity, this direction is preferably the direction where the angle with respect to the zero OPD line is largest.
2. Along each line parallel to such selected direction, identify all possible groups of N contiguous pixels for processing by an N-point algorithm. In general, the value of N is selected in such a way that it offers the best compromise between correct shape/defect detection and noise attenuation. More pixels tend to lower the noise in calculating the surface profile but also tend to overlook small defects. A small value of N will be more sensitive to defects of small spatial size but it will also be more affected by the overall noise in the image. A good value for N is usually between 5 and 8.
3. Determine the spatial fringe frequency for each set of N consecutive pixels. This can be done on the fly, as the algorithm processes consecutive sets of N data points with a moving window, or as a separate determination.
4. Generate and apply the best algorithm for the frequency so determined for the current set of N pixels (i.e. adapt the chosen N-point algorithm by calculating optimal coefficients for the fringe frequency of the set of N data points under consideration).

The strategy employed in building the adaptive algorithm of the preferred protocol is best explained by the examples that follow. In general, the irradiance of the signal can be written for each pixel as in Equation (1) below:

$$I(x_n) = DC + V\cos[\alpha(x_n) + \varphi + \varepsilon(x_n)]$$

$$= DC + \frac{V}{2}\{e^{i[\alpha(x_n)+\varphi+\varepsilon(x_n)]} + e^{-i[\alpha(x_n)+\varphi+\varepsilon(x_n)]}\}$$

where the quantity of interest is the phase ψ. "$x_n$" is the position of the pixel with respect to a common origin along the straight line represented by the N pixels, "DC" represents the DC component of the signal, "V" represents the amplitude of the AC component and "ε" represents unknown random errors that vary from pixel to pixel. The quantity "$\alpha(x_n)$" is, in general, a linear function of $x_n$ and is proportional to the signal frequency. For example, when the distance between consecutive pixels is Δx and the wavelength used in the measurements is λ, the following set of Equations (2) holds true:

$$\alpha(x_n) = \frac{4\pi\Delta x}{\lambda\tan(u)} \equiv 2\pi F n$$

$$F \equiv \frac{2\Delta x}{\lambda\tan(u)}$$

In these expressions, the value "u" represents the angle between the reference mirror and the direction of motion of the sample and it is known a priori. When u also corresponds to the angle of the line passing through the N pixels being processed (i.e. the tilt angle is also reflected locally), the frequency F flows from the set of Equations (2). Using, for example, a tilt that produces a spatial angular frequency F of about π/2 (i.e. a 90° angular frequency), standard algorithms exist such that the phase value ψ may be determined by the general expression (3):

$$\tan(\varphi) = \frac{\sum a_n I_n}{\sum b_n I_n}$$

where the coefficients "a" and "b" are calculated a priori and optimized for a 90° angular frequency. (See, for example J. Schmit and K. Creath, "Extended Averaging Technique for Derivation of Error-Compensating Algorithms in Phase-Shifting Interferometry," Appl. Opt., Vol 34 (19), pp. 3610-3619 (July 1995)).

However, because of surface irregularities, the local value of the frequency F is not well known a priori. Therefore, the first step in adapting an algorithm to the local conditions according to the invention is to determine the frequency F of the N pixels being processed by performing a Discrete Fourier Transform (DFT), preferably with a zero-padded signal for better resolution and accuracy. Once the frequency has been so determined, the best set of complex coefficients "$A_n$" matching this frequency is calculated by adopting, for simplicity, a phase functionality expressed by the quantity (4):

$$S(\varphi) \equiv \sum_n A_n I(x_n)$$

which, in order to enable the determination of the phase ψ, from Equation 1 must have the property shown in Equation (5) below:

$$S(\varphi) \propto e^{\pm i\varphi}$$

Further inspection of the form of Equation 1 leads to the conclusion that Equation 5 can be satisfied if and only if either one of the following systems is satisfied (Equations 6):

$$\begin{cases} DC\sum_n A_n = 0 \\ \frac{Ve^{-i\varphi}}{2}\sum_n A_n e^{i[2\pi F n+\varepsilon(x_n)]} = 0 \end{cases}$$

$$S(\varphi) = \frac{Ve^{-i\varphi}}{2}\sum_n A_n e^{i[2\pi F n+\varepsilon(x_n)]}$$

or $$\begin{cases} DC\sum_n A_n = 0 \\ \frac{Ve^{-i\varphi}}{2}\sum_n A_n e^{i[2\pi F n+\varepsilon(x_n)]} = 0 \end{cases}$$

$$S(\varphi) = \frac{Ve^{i\varphi}}{2}\sum_n A_n e^{i[2\pi F n+\varepsilon(x_n)]}$$

In either case the expression for S(ψ) will involve an additional fixed phase factor introduced by the summation. Since in measuring the shape of the sample only the relative position of the surface points is of interest, such additional term will have no significance for the purpose of mapping the surface. If, however, the exact phase of the signal must be determined for some reason, the additional fixed phase factor can be easily determined from the equations above.

Assuming that the values of DC and V are not zero (an assumption that conforms to the conditions during sampling), the two systems of Equations 6 written above can be simplified to Equations (7) below:

$$\begin{cases} \sum_n A_n = 0 \\ \sum_n A_n e^{\pm i[2\pi F n+\varepsilon(x_n)]} = 0 \end{cases}$$

which can be further simplified by expressing the exponential term involving the unknown quantities $\varepsilon(x_n)$ in polynomial form. Based on the Weirstrass theorem (which states that each function can be approximated infinitely well by polynomials), it is possible to write (considering $x_n$ and $\varepsilon(x_n)$ as a variable and an arbitrary function, respectively) and Equation (8):

$$e^{\pm i\varepsilon(x_n)} = \cos[\varepsilon(x_n)]i\sin[\varepsilon(x_n)] \cong \sum_{k=0} p_k x_n^k \pm i\sum_{k=0} q_k x_n^k$$

where $p_k$ and $q_k$ are unknown coefficients. Considering now that the values of $x_n$ are uniformly distributed within the interval Δx (such that $x_n = n\Delta x$) and neglecting the common offset from the origin, it is possible to write an Equation (9):

$$e^{\pm i\varepsilon(x_n)} \cong \sum_{k=0} p_k n^k \pm i \sum_{k=0} q_k n^k$$

where the value of Δx has been tacitly incorporated into the definition of the unknown coefficients $p_k$ and $q_k$; and the value of n is not necessarily integer, but successive values of n are separated by a single unit (for example, a possible selection of values for n can be $\{-1/2, +1/2, +3/2, \ldots\}$).

Using Equation 9, the system of Equations 7 can be then written as Equations 10 below:

$$\begin{cases} \sum_n A_n = 0 \\ \sum_n A_n e^{\pm i2\pi FN} \left[ \sum_{k=0} p_k n^k \pm i \sum_{k=0} q_k n^k \right] = 0 \end{cases}$$

Based on the fact that $p_k$ and $q_k$ are independent random variables, it is possible to simplify the solution of the system by selecting the condition when each pair of coefficient $p_k$ and $q_k$ cancels independently. The system of Equations 10 then becomes Equations 11 below:

$$\begin{cases} \sum_n A_n = 0 \\ \sum_n A_n e^{\pm i2\pi FN} n^k = 0 \quad k = 0, 1 \ldots \end{cases}$$

where k in theory is as large as infinity but in practice is judiciously selected so as to produce a number of system equations no larger than the number of unknown variables (so that the system can be solved).

For convenience of notation, the following additional change of variables is performed (Equation (12)):

$$C_n = A_n e^{\pm i2\pi Fn} \Leftrightarrow A_n \equiv C_n e^{\mp i2\pi Fn}$$

such that the system (11) can be written as Equations (13):

$$\begin{cases} \sum_n C_n e^{\mp i2\pi Fn} = 0 \\ \sum_n C_n n^k = 0 \quad k = 0, 1 \ldots \end{cases}$$

which reduces the problem to determining the values of the coefficients $C_n$ that satisfy these two equations. In the most general case, the coefficients $C_n$ can have the complex form in Equation 14 below:

$$C_n = a_n + i b_n \Rightarrow A_n \equiv (a_n + i b_n) e^{\mp i2\pi Fn}$$

Accordingly, the system of Equations 13 becomes the set of Equations 15:

$$\begin{cases} \sum_n a_n \cos(2\pi Fn) \pm b_n \sin(2\pi Fn) = 0 \\ \sum_n a_n \sin(2\pi Fn) \mp b_n \cos(2\pi Fn) = 0 \\ \sum_n a_n n^k = 0 \quad k = 0, 1 \ldots \\ \sum_n b_n n^k = 0 \quad k = 0, 1 \ldots \end{cases}$$

Once the values of $a_n$ and $b_n$ are calculated from the system of Equations 15, the phase ψ corresponding to the location being processed can be determined in straightforward manner from the usual arctangent relation of Equation 16:

$$\varphi = \mp \arg[S(\varphi)] = \mp \arg\left[ \sum_n (a_n + i b_n) e^{\mp i2\pi Fn} I_n \right]$$

As mentioned before, if the exact value of the signal's phase is required (as in the case of Single Frame Interferometry), the value obtained from Equation 16 is corrected by subtracting the phase of the expression (17):

$$\sum_n A_n e^{\mp i2\pi Fn} = \sum_n (a_n + i b_n) e^{\mp i4\pi Fn}$$

An important simplification in the system of Equations 15 can be obtained by selecting values of n that are symmetrical with respect the origin. For example, in the case when an odd number of points (2N+1) is considered, the values for n should be $n = \{-N, -N+1 \ldots 0 \ldots N\}$. When an even number of points (2N) is considered, the values for n should be $$n = \left\{ -N + \frac{1}{2}, -N + \frac{3}{2}, \ldots -\frac{1}{2}, \frac{1}{2} \ldots N - \frac{1}{2} \right\}$$

Together with appropriate symmetry conditions for the coefficients $a_n$ and $b_n$ in Equations 18:

$$\begin{cases} a_{-n} = \pm a_n \\ b_{-n} = \pm b_n \end{cases}$$

the last two equations will become an identity for all odd (or even) values of k.

Thus, the set of Equations 15 and 16 can be easily used in the preferred protocol to generate optimal algorithms for any signal frequency F. Inasmuch as the $a_n$ and $b_n$ coefficients represent real and complex components of the equations, their solution may be simplified by selecting the case when $b_n = 0$. Examples are given below explicitly for such case.

Using a Five-Point Algorithm, in the case when $b_n=0$ the system of Equations 15 becomes Equations 19:

$$\begin{cases} \sum_n a_n \cos(2\pi F n) = 0 \\ \sum_n a_n n^k = 0 \qquad k = 0, 1 \ldots \end{cases}$$

If the values of n are selected symmetrically around 0 (n={-2, -1,0,1,2}) and if $a_n$ is set to be even, $a_n = a_{-n}$, then the second equation becomes a true identity for all values of k that are odd. The system then becomes Equations 20:

$$\begin{cases} a_0 + 2a_1 \cos(2\pi F) + 2a_2 \cos(4\pi F) = 0 \\ a_0 + 2a_1 + 2a_2 = 0 \end{cases}$$

which is easily solved to yield Equations 21:

$$\begin{cases} a_1 = \dfrac{a_0[1 - \cos(4\pi F)]}{2[\cos(4\pi F) - \cos(2\pi F)]} \\ a_2 = \dfrac{a_0[\cos(2\pi F) - 1]}{2[\cos(4\pi F) - \cos(2\pi F)]} \end{cases}$$

Since the value of $a_0$ is arbitrary, choosing $a_0=1$ will produce the following general solution (22) after simple trigonometric manipulation:

$$\begin{cases} a_0 = 1 \\ a_{-1} = a_1 = \dfrac{-1 - \cos(2\pi F)}{1 + 2\cos(2\pi F)} \\ a_{-2} = a_2 = \dfrac{1}{2[1 + 2\cos(2\pi F)]} \\ b_{-2} = b_{-1} = b_0 = b_1 = b_2 = 0 \end{cases}$$

The equations for a larger number of data points may be formulated in a similar manner. For a Six-Point Algorithm, for example, the coefficients are determined to be as in Equations (23):

$$\begin{cases} a_{-\frac{5}{2}} = -a_{\frac{5}{2}} = 1 \\ a_{-\frac{3}{2}} = -a_{\frac{3}{2}} = -3 - 2\cos(2\pi F) \\ a_{-\frac{1}{2}} = -a_{\frac{1}{2}} = 2[2 + 3\cos(2\pi F)] \\ b_{-\frac{5}{2}} = b_{-\frac{3}{2}} = b_{-\frac{1}{2}} = b_{\frac{1}{2}} = b_{\frac{3}{2}} = b_{\frac{5}{2}} = 0 \end{cases}$$

For a Seven-Point Algorithm, the coefficients are similarly determined to be as in Equations 24:

$$\begin{cases} a_{-3} = a_3 = 1 \\ a_{-2} = a_2 = -2[2 + \cos(2\pi F)] \\ a_{-1} = a_1 = 7 + 8\cos(2\pi F) \\ a_0 = -4[2 + 3\cos(2\pi F)] \\ b_{-3} = b_{-2} = b_{-1} = b_0 = b_1 = b_2 = b_3 = 0 \end{cases}$$

Finally, a similar manipulation for an Eight-Point Algorithm yields Equations 25:

$$\begin{cases} a_{-\frac{7}{2}} = -a_{\frac{7}{2}} = 1 \\ a_{-\frac{5}{2}} = -a_{\frac{5}{2}} = 5 + 2\cos(2\pi F) \\ a_{-\frac{3}{2}} = -a_{\frac{3}{2}} = -11 - 10\cos(2\pi F) \\ a_{-\frac{1}{2}} = -a_{\frac{1}{2}} = 5[3 + 4\cos(2\pi F)] \\ b_{-\frac{7}{2}} = b_{-\frac{5}{2}} = b_{-\frac{3}{2}} = b_{-\frac{1}{2}} = b_{\frac{1}{2}} = b_{\frac{3}{2}} = b_{\frac{5}{2}} = b_{\frac{7}{2}} = 0 \end{cases}$$

The adaptive algorithm is suitable for low-resolution, fast-acquisition approach of defect identification using spatial-carrier single frame interferometry. The adaptive algorithm of the preferred protocol provides improved recovery of the defect shape and size, relative to conventional algorithms optimized for the overall tilt of the sample, and is of particular utility in the distinguishing between intrinsic and extrinsic defects.

In practice, the entire surface area of a large sample (e.g. up to about 600×600 mm$^2$) is typically scanned in serpentine fashion with an objective of relatively low magnification M1 and a field of view 1.27×0.96 mm$^2$ at a speed of 0.25 sec per measurement, which produces the acquisition of 300×400 images over a period of about 30 minutes. The object panel is tilted so as to produce an average spatial fringe frequency corresponding to the number of linear detector pixels per fringe required for optimal performance of the chosen algorithm. According to the preferred protocol, as the algorithm sequentially processes sets of N data points acquired during the scan, each set is first processed with a Fourier Transform module to calculate the fringe frequency corresponding to those points. The frequency information is then fed to the adaptive algorithm of the invention to provide an optimal set of parameters for the algorithm to be used in processing that set of N data points under consideration. The same procedure is repeated at each step as the N set of data points is renewed while the data processing progressed through the entire area of the sample surface. Where the resulting profile shows a defect requiring more precise measurement, the sample is then measured again locally with conventional PSI or VSI interferometry (e.g. Z-scan PSI) at the relatively higher magnification M2 produce an accurate profile of the defect area. At the frame rate available for the measurement (0.016 seconds per frame, using a Wyko® SP9900 profiler, the single-frame measurement of the entire surface of the sample takes about 30 minutes, which is sufficient to identify and re-measure the defects with high accuracy.

The invention is further illustrated by the following examples. The examples are not intended to limit the invention as described above. Modification of detail may be made without departing from the scope of the invention.

EXAMPLES

The surface roughness of samples of polymer film (manufactured as described below) was analysed in accordance with the methods described herein using a Wyko SSP9910 Single Frame Interferometer, also equipped with both PSI and VSI capability. The measurement area of the film was 31×33 cm.

In the first SFI profiling step, the magnification used was ×2.5, the modulation threshold was set at 1%, the cut-off threshold was set at 0.25 μm, and $N_{NAP}$ was set at 2 adjoining pixels (1 pixel=approx. 3.5 μm).

In the second profiling step, the locations identified in the LMFF file generated from the first profiling step technique were re-examined at higher magnification (×25) using the same equipment in either PSI mode or VSI mode. In the PSI mode, the modulation threshold was 10% and the cut-off threshold was 0.25 μm. In the VSI mode, the modulation threshold was 0.2% and the cut-off threshold was 0.25 μm. Intrinsic defects were considered as those covering at least 9 adjoining but not necessarily co-linear pixels. The values described herein for $N_{DT}$, $N_{PP}$ and $N_{GS}$ are derived from the PSI scans or VSI scans, as appropriate.

Examples 1, 2 and 3

Coextruded films having an AB layer structure were manufactured in accordance with conventional techniques. A polymer composition comprising unfilled PET (as the B layer) was co-extruded with a second polymer layer (as the A-layer), as follows:
Ex.1: unfilled PET (as used in the base layer)
Ex.2: an ethylene-methacrylic acid polymer (Nucrel®0908HS)
Ex.3: an ethylene-methacrylic acid polymer (Nucrel®0411HS).

The extrudate was cast onto a cooled rotating drum, pre-heated to a temperature of 80 to 81° C. and stretched in the direction of extrusion to approximately 3.4 times its original dimensions. The film was heated to a temperature of about 95° C., passed into a stenter oven at a temperature of 110° C. where the film was stretched in the sideways direction to approximately 3.6 times its original dimensions, and then the biaxially-stretched film was heat-set by successive heating in three zones of defined temperature (225, 225 and 190° C.) by conventional means at a film-web speed of 10.8 m/min; approximate residence time in each of the three zones was 40 seconds. The final thickness of the PET base layer (B) was about 100 μm, and the final thickness of the coextruded EMAA or PET layer (A) was about 15 μm. The EMAA layers were strippable layers.

The surfaces of the PET polyester substrate in Examples 2 and 3 were analysed directly after stripping the EMAA layer by hand. The surface of the thin PET layer A of the polyester substrate of Example 1 was analysed directly after manufacture. The results are presented in Table 1 below. The values for $N_{DT}$, $N_{PP}$ and $N_{GS}$ are derived from PSI scans. The values for $\Delta$-$N_{DT}$, $\Delta$-$N_{PP}$ and $\Delta$-$N_{GS}$ are calculated for Examples 2 and 3 using Example 1 as the control film. All three examples were manufactured on a standard film-forming line and no special steps were taken to provide to a clean environment or to reduce the amount of air-borne dust and debris.

TABLE 1

| Ex. | $N_{DT}$ | $\Delta$-$N_{DT}$ | $N_{PP}$ | $\Delta$-$N_{PP}$ | $N_{GS}$ | $\Delta$-$N_{GS}$ | $N_E$ |
|---|---|---|---|---|---|---|---|
| Ex. 1 | 2796 | — | 366 | — | 43 | — | 76 |
| Ex. 2 | 718 | 3.9 | 63 | 5.8 | 0 | → ∞ | 13 |
| Ex. 3 | 443 | 6.3 | 54 | 6.8 | 0 | → ∞ | 36 |

Examples 4 and 5

Example 4 consists of a monolayer of unfilled PET of the same composition as the PET layers in the coextruded bi-layer film of Example 1. Example 5 is a coextruded film corresponding to Example 3, comprising a substrate layer of the same unfilled PET of Example 4, and a strippable layer of Nucrel®0411HS. The PET layer in each of Examples 4 and 5 is the same thickness and is derived from the same (primary) extruder. The surface of the PET substrate in Example 5 was analysed as before and directly after stripping the EMAA layer by hand, and then compared with the surface of the PET monolayer film of Example 4 which was analysed directly after manufacture. The results are presented in Table 2 below. The absolute defect numbers in Table 2 are lower than in Table 1 because additional steps were taken during film manufacture to provide a clean environment.

TABLE 2

| Ex. | $N_{DT}$ | $\Delta$-$N_{DT}$ | $N_{PP}$ | $\Delta$-$N_{PP}$ | $N_{GS}$ | $\Delta$-$N_{GS}$ | $N_E$ |
|---|---|---|---|---|---|---|---|
| Ex. 4 | 94 | — | 22 | — | 33 | — | 36 |
| Ex. 5 | 81 | 1.16 | 4 | 5.5 | 1 | 33 | 6 |

X-ray photoelectron spectroscopy (XPS) and secondary ion mass spectrometry (SIMS)

Further analysis of the sample surface may be conducted using XPS and static SIMS, using a Kratos "Axis Ultra" instrument and an Ion-Tof "ToFSIMS IV" instrument, respectively. The objective of the analyses was to identify chemical differences between a defect and the bulk polymer of the film to differentiate extrinsic and intrinsic defects.

XPS is a quantitative spectroscopic technique which measures the elemental composition, empirical formula, chemical and electronic states of elements that exist within a material. XPS spectra are obtained by using X-rays to irradiate a material while measuring the kinetic energy and number of the emitted electrons from the top 1 to 10 nanometers of the material. The detection limit is around 1 atom in 1000 (excluding H, i.e. 0.1 atomic percent or 1000 ppm).

SIMS is a technique involving sputtering material surfaces with a primary ion beam and collecting and analyzing emitted secondary ions. A mass spectrometer is used to measure the secondary ions to determine the elemental and/or molecular composition of the material surface. Static SIMS is the process used in atomic monolayer analysis of material surfaces, and has a typical sampling depth of about 1nm. SIMS is not generally suitable as a quantitative technique for individual analyses, but can usefully be used to compare a series of similar sample surfaces via analysis of peak area ratios as a measure of the relative amounts of identified species present in those surfaces.

For the XPS analysis, data were recorded from a ca. 300 μm×700 μm elliptical area using monochromated Al kα X-rays. A survey scan was recorded at 160 eV pass energy to identify all elements present on the surface; these were also used to quantify the surface composition. High-resolution spectra were also recorded at 20 eV pass energy in order to identify the chemical environment for specific elements. The results are presented as relative atomic percentage compositions. The expanded uncertainty (Y) in atomic percentage units, associated with a measured atomic percentage composition (X) was calculated for polymer and organic materials analysed using survey scan conditions from the expression Y=mX+c where m=0.027 and c=0.14. The reported expanded uncertainty is based on a standard uncertainty multiplied by a coverage factor of k=2, providing a level of confidence of approximately 95%.

For the SSIMS analysis, positive and negative ion spectra were recorded from fresh areas of each sample with high mass resolution (m/Δm ca. 6000) up to m/z 2000 in all cases.

The invention claimed is:

1. An interferometric method for profiling the topography of a sample surface, said method comprising the steps of:
   (i) a first interferometric profiling step in which a sample surface is analysed by single-frame interferometry (SFI) at a relatively low first magnification M1 to produce a map comprising pixels with planar (X,Y)-coordinates corresponding to the area of the sample surface,
   (ii) interrogating the pixel data obtained from the first profiling step by identifying pixel(s) which meet or exceed a Cut-Off Threshold, and which also meet or exceed a parameter $N_{NAP}$ which is the number of adjacent pixels all of which meet or exceed the Cut-Off Threshold;
   (iii) interrogating the pixel data obtained from the first profiling step by identifying pixel(s) for which no z-coordinate has been recorded;
   (iv) generating a Low Magnification Frame File (LMFF) which comprises the (X,Y) coordinates of the pixels derived from steps (ii) and (iii);
   (v) a second interferometric profiling step in which the sample surface is analysed at a relatively high second magnification M2, wherein M2>M1, wherein only selected regions of the sample surface are analysed at said second magnification M2, wherein said selected regions comprise the features associated with the (X,Y)-coordinates of the pixels in the Low Magnification Frame File;
   and further comprising:
   (vi) the step of analysis of the output of the second interferometric profiling step to differentiate between an intrinsic defect and an extrinsic defect.

2. The method of claim 1 wherein an intrinsic defect is differentiated from an extrinsic defect on the basis of do analysis of one or both of:
   (i) the shape of the defect; and
   (ii) the optical properties of the defect.

3. The method of claim 1 wherein an intrinsic defect is differentiated from an extrinsic defect by analysis of the data-loss pixels associated with the defect.

4. The method of claim 3 wherein said analysis comprises analysis of one or both of:
   (i) the number of data-loss pixels, relative to the total number of pixels collected, for a defect under said high magnification (M2), and
   (ii) the lateral extent of a data-loss region associated with that defect.

5. The method of claim 1 wherein:
   (i) an intrinsic defect is characterised by a set of pixels in which the number of data-loss pixels is less than 50%, preferably no more than 5%, of the total number of pixels collected for that defect under said magnification (M2); and
   (ii) an extrinsic defect is characterised by a set of pixels in which the number of data-loss pixels is at least 50%, preferably at least 90%, of the total number of pixels collected for that defect under said magnification (M2).

6. The method of claim 1 wherein:
   (i) an intrinsic defect is characterised by the lateral extent of a data-loss region associated with that defect, such that the number of contiguous pixels in any one data-loss region is less than 10 under said high magnification (M2); and
   (ii) an extrinsic defect is characterised by the lateral extent of a data-loss region associated with that defect, such that the number of contiguous pixels in any one data-loss region is at least 10, preferably at least 100.

7. The method of claim 1 wherein:
   (i) an intrinsic defect is characterised by a set of pixels for which X and/or Y slope is calculable between the majority of adjacent pixels; and
   (ii) an extrinsic defect is characterised by a set of pixels for which X and/or Y slope is incalculable between the majority of adjacent pixels.

8. The method of claim 1 wherein an intrinsic defect is characterised by a mean slope in one or both of the X and Y directions of no more than 1.0, and in one embodiment no more than 0.3.

9. The method of claim 1 wherein an extrinsic defect is characterised by a data-loss region which is irregular in shape.

10. The method of claim 1 wherein M2 is at least 20×.

11. The method of claim 1 wherein the sample surface is a surface of a polymeric film.

12. The interferometric method of claim 1 which comprises the following steps:
    (i) acquiring an interferogram from the sample surface;
    (ii) calculating a spatial fringe frequency from a set of interferogram data points;
    (iii) modifying the processing algorithm to obtain an adapted algorithm conforming to the spatial fringe frequency of said set of interferogram data points based on the spatial fringe frequency so calculated;
    (iv) determining a phase corresponding to the set of interferogram data points using the adapted algorithm; and
    (v) processing the interferogram to produce a profile of the sample surface by repeating said calculating, modifying and determining steps for successive sets of interferogram data points.

13. The method of claim 12, wherein said processing algorithm is a phase-shifting algorithm.

14. The method of claim 12 wherein said calculating step is carried out with a Fourier Transform technique.

15. The method of claim 12, wherein said processing algorithm is formulated in terms of equations relating a set of coefficients to fringe frequency; said step of modifying the processing algorithm is carried out by finding values for said set of coefficients that satisfy the equations when the fringe frequency is equal to said spatial fringe frequency; and said step of determining a phase is carried out with an arctangent function expressed in terms of said values for the set of coefficients and said irradiance measurements.

16. The method of claim 15, wherein said arctangent function is $$\varphi = \mp \arg\left[\sum_n (a_n + ib_n)e^{\mp i2\pi F n} I_n\right]$$

wherein F is fringe frequency; $I_n$ is irradiance registered at pixel n; n is a pixel index in a number N of consecutive image pixels being processed by the algorithm, $1 \le n \le N$; and the coefficients $a_n$ and $b_n$ are calculated from the system of equations:

$$\begin{cases} \sum_n a_n \cos(2\pi Fn) \pm b_n \sin(2\pi Fn) = 0 \\ \sum_n a_n \sin(2\pi Fn) \mp b_n \cos(2\pi Fn) = 0 \\ \sum_n a_n n^k = 0 \qquad k = 0, 1 \ldots \\ \sum_n b_n n^k = 0 \qquad k = 0, 1 \ldots \end{cases}$$

where k is selected so as to produce a total number of said equations that is not larger than the number of said set of coefficients.

17. The method of claim 16, wherein N=5, 6, 7 or 8 such that: wherein N=5 and the coefficients $a_n$ and $b_n$ are calculated from the system of equations:

$$\begin{cases} a_0 = 1 \\ a_{-1} = a_1 = \dfrac{-1 - \cos(2\pi F)}{1 + 2\cos(2\pi F)} \\ a_{-2} = a_2 = \dfrac{1}{2[1 + 2\cos(2\pi F)]} \\ b_{-2} = b_{-1} = b_0 = b_1 = b_2 = 0 \end{cases}$$

or N=6 and the coefficients $a_n$ and $b_n$ are calculated from the system of equations:

$$\begin{cases} a_{-\frac{5}{2}} = -a_{\frac{5}{2}} = 1 \\ a_{-\frac{3}{2}} = -a_{\frac{3}{2}} = -3 - 2\cos(2\pi F) \\ a_{-\frac{1}{2}} = -a_{\frac{1}{2}} = 2[2 + 3\cos(2\pi F)] \\ b_{-\frac{5}{2}} = b_{-\frac{3}{2}} = b_{-\frac{1}{2}} = b_{\frac{1}{2}} = b_{\frac{3}{2}} = b_{\frac{5}{2}} = 0 \end{cases}$$

or N=7 and the coefficients $a_n$ and $b_n$ are calculated from the system of equations:

$$\begin{cases} a_{-3} = a_3 = 1 \\ a_{-2} = a_2 = -2[2 + \cos(2\pi F)] \\ a_{-1} = a_1 = 7 + 8\cos(2\pi F) \\ a_0 = -4[2 + 3\cos(2\pi F)] \\ b_{-3} = b_{-2} = b_{-1} = b_0 = b_1 = b_2 = b_3 = 0 \end{cases}$$

or N=8 and the coefficients $a_n$ and $b_n$ are calculated from the system of equation:

$$\begin{cases} a_{-\frac{7}{2}} = -a_{\frac{7}{2}} = 1 \\ a_{-\frac{5}{2}} = -a_{\frac{5}{2}} = 5 + 2\cos(2\pi F) \\ a_{-\frac{3}{2}} = -a_{\frac{3}{2}} = -11 - 10\cos(2\pi F) \\ a_{-\frac{1}{2}} = -a_{\frac{1}{2}} = 5[3 + 4\cos(2\pi F)] \\ b_{-\frac{7}{2}} = b_{-\frac{5}{2}} = b_{-\frac{3}{2}} = b_{-\frac{1}{2}} = b_{\frac{1}{2}} = b_{\frac{3}{2}} = b_{\frac{5}{2}} = b_{\frac{7}{2}} = 0. \end{cases}$$

18. The interferometric method of claim 1 comprising the following steps:
(i) acquiring single-frame spatial-carrier interferogram data from the sample surface;
(ii) selecting a processing algorithm for profiling the sample surface based on a predetermined expected size of the defects;
(iii) calculating a spatial fringe frequency from a set of said interferogram data;
(iv) modifying the processing algorithm to obtain an adapted algorithm conforming to the spatial fringe frequency of said set of interferogram data based on the spatial fringe frequency so calculated; and
(v) processing the interferogram data to produce a profile of the sample surface by repeating said calculatin and modifying steps for successive sets of interferogram data.

19. The method of claim 18, wherein said processing algorithm phase-shifting algorithm.

20. The method of claim 18, wherein said calculating step is carried out with Fourier Transform technique.

21. The method of claim 18, wherein said processing algorithm is formulated in terms of equations relating a set of coefficients to fringe frequency; said step of modifying the processing algorithm is carried out by finding values for said set of coefficients that satisfy the equations when the fringe frequency is equal to said spatial fringe frequency; and said step of processing the interferogram data is carried out with an arctangent function expressed in terms of said values for the set of coefficients and irradiance measurements corresponding to said spatial fringe frequency.

22. The method of claim 21, wherein said arctangent is $$\varphi = \mp \arg\left[\sum_n (a_n + ib_n) e^{\mp i 2\pi F n} I_n\right]$$

wherein F is fringe frequency; $I_n$ is irradiance registered at pixel n; n is a pixel index in a number N of consecutive image pixels being processed by the algorithm, $1 \leq n \leq N$; and the coefficients $a_n$ and $b_n$ are calculated from the system of equations:

$$\begin{cases} \sum_n a_n \cos(2\pi Fn) \pm b_n \sin(2\pi Fn) = 0 \\ \sum_n a_n \sin(2\pi Fn) \mp b_n \cos(2\pi Fn) = 0 \\ \sum_n a_n n^k = 0 \qquad k = 0, 1 \ldots \\ \sum_n b_n n^k = 0 \qquad k = 0, 1 \ldots \end{cases}$$

where k is selected so as to produce a total number of said equations that is not larger than the number of said set of coefficients.

23. The method according claim 1 wherein said method comprises adapting an interferometric processing algorithm to a local fringe frequency of an interferogram, said method comprising the following steps:
(i) formulating the algorithm in terms of equations relating a set of coefficients to fringe frequency;
(ii) finding values for said set of coefficients that satisfy the equations when the fringe frequency is equal to said local fringe frequency;
(iii) determining a phase with an arctangent function expressed in terms of said values for the set of coefficients and irradiance measurements corresponding to said local fringe frequency; and (iv) repeating the step of finding values for the set of coefficients and the step of determining a phase for successive local fringe frequencies of the interferogram.

24. The method of claim 23 wherein said arctangent function is $$\varphi = \mp \arg\left[\sum_n (a_n + ib_n)e^{\mp i2\pi Fn}I_n\right]$$

wherein F is fringe frequency; $I_n$ is irradiance registered at pixel n; n is a pixel index in a number N of consecutive image pixels being processed by the algorithm, $1 \leq n \leq N$; and the coefficients $a_n$ and $b_n$ are calculated from the system of equations:

$$\begin{cases} \sum_n a_n \cos(2\pi Fn) \pm b_n \sin(2\pi Fn) = 0 \\ \sum_n a_n \sin(2\pi Fn) \mp b_n \cos(2\pi Fn) = 0 \\ \sum_n a_n n^k = 0 \quad\quad k = 0, 1\ldots \\ \sum_n b_n n^k = 0 \quad\quad k = 0, 1\ldots \end{cases}$$

where k is selected so as to produce a total number of said equations that not larger than the number of said set of coefficients.

25. The method of claim 24, wherein N=5, 6, 7 or 8 such that: N=5 and the coefficients $a_n$ and $b_n$ are calculated from the system of equations:

$$\begin{cases} a_0 = 1 \\ a_{-1} = a_1 = \dfrac{-1 - \cos(2\pi F)}{1 + 2\cos(2\pi F)} \\ a_{-2} = a_2 = \dfrac{1}{2[1 + 2\cos(2\pi F)]} \\ b_{-2} = b_{-1} = b_0 = b_1 = b_2 = 0 \end{cases}$$

or N=6 and the coefficients $a_n$ and $b_n$ are calculated from the system of equations:

$$\begin{cases} a_{-\frac{5}{2}} = -a_{\frac{5}{2}} = 1 \\ a_{-\frac{3}{2}} = -a_{\frac{3}{2}} = -3 - 2\cos(2\pi F) \\ a_{-\frac{1}{2}} = -a_{\frac{1}{2}} = 2[2 + 3\cos(2\pi F)] \\ b_{-\frac{5}{2}} = b_{-\frac{3}{2}} = b_{-\frac{1}{2}} = b_{\frac{1}{2}} = b_{\frac{3}{2}} = b_{\frac{5}{2}} = 0 \end{cases}$$

or N=7 and the coefficients $a_n$ and $b_n$ are calculated from the system equations:

$$\begin{cases} a_{-3} = a_3 = 1 \\ a_{-2} = a_2 = -2[2 + \cos(2\pi F)] \\ a_{-1} = a_1 = 7 + 8\cos(2\pi F) \\ a_0 = -4[2 + 3\cos(2\pi F)] \\ b_{-3} = b_{-2} = b_{-1} = b_0 = b_1 = b_2 = b_3 = 0 \end{cases}$$

or N=8 and the coefficients $a_n$ and $b_n$ are calculated from the system of equations:

$$\begin{cases} a_{-\frac{7}{2}} = -a_{\frac{7}{2}} = 1 \\ a_{-\frac{5}{2}} = -a_{\frac{5}{2}} = 5 + 2\cos(2\pi F) \\ a_{-\frac{3}{2}} = -a_{\frac{3}{2}} = -11 - 10\cos(2\pi F) \\ a_{-\frac{1}{2}} = -a_{\frac{1}{2}} = 5[3 + 4\cos(2\pi F)] \\ b_{-\frac{7}{2}} = b_{-\frac{5}{2}} = b_{-\frac{3}{2}} = b_{-\frac{1}{2}} = b_{\frac{1}{2}} = b_{\frac{3}{2}} = b_{\frac{5}{2}} = b_{\frac{7}{2}} = 0 \end{cases}$$

26. The method of claim 1 wherein said sample surface is assessed by applying one or more of the following criteria, wherein the vertical amplitude is measured relative to, and orthogonal to, the mean plane:
   (i) The number ($N_{DT}$) of all defects with a vertical amplitude within a pre-determined range, for a pre-determined area of sample surface;
   (ii) The number ($N_{PP}$) of pinch-point peaks with a vertical amplitude within a pre-determined range, for a pre-determined area of sample surface;
   (iii) The number ($N_{GS}$) of gel-like features or streaks with a vertical amplitude within a pre-determined range, for a pre-determined area of sample surface;
   (iv) The number ($N_E$) of extrinsic defects for a pre-determined area of sample surface, or the number of extrinsic defects having a defined characteristic, for a pre-determined area of sample surface; and
   (v) The number of features having mean or maximum X and/or Y slopes which are equal to or greater than a pre-determined level, for a pre-determined area of sample surface.

27. An interferometric method for profiling the topography of a sample surface, said method comprising the steps of:
   (i) a first interferometric profiling step in which a sample surface is analysed by single-frame interferometry (SFI) at a relatively low first magnification M1 to produce a map comprising pixels with planar (X,Y)-coordinates corresponding to the area of the sample surface,
   (ii) interrogating the pixel data obtained from the first profiling step by identifying pixel(s) which meet or exceed a Cut-Off Threshold, and which also meet or exceed a parameter $N_{NAP}$ which is the number of adjacent pixels all of which meet or exceed the Cut-Off Threshold;
   (iii) interrogating the pixel data obtained from the first profiling step by identifying pixel(s) for which no z-coordinate has been recorded;
   (iv) generating a Low Magnification Frame File (LMFF) which comprises the (X,Y) coordinates of the pixels derived from steps (ii) and (iii);
   (v) a second interferometric profiling step in which the sample surface is analysed at a relatively high second magnification M2, wherein M2>M1, wherein only selected regions of the sample surface are analysed at said second magnification M2, wherein said selected regions comprise the features associated with the (X,Y)-coordinates of the pixels in the Low Magnification Frame File;

(vi) the step of analysis of the output of the second interferometric profiling step to differentiate between an intrinsic defect and an extrinsic defect;

and further comprising one or both of:

(vii) the step of analysis of the output of the second interferometric profiling step to assess whether said sample surface meets one or more quality control standard(s) and/or one or more target property or properties; and (viii) the step of analysis of the output of the second interferometric profiling step to assess whether said sample surface is suitable as a surface for subsequent coating.

28. The method of claim 1 wherein the sample surface is a surface of a polyester film.

29. The method of claim 1 where the sample surface is a surface of a biaxially oriented polyester film.

30. The method of claim 27 wherein said sample surface is assessed by applying one or more of the following criteria, wherein the vertical amplitude is measured relative to, and orthogonal to, the mean plane:

(i) The number ($N_{DT}$) of all defects with a vertical amplitude within a pre-determined range, for a pre-determined area of sample surface;

(ii) The number ($N_{PP}$) of pinch-point peaks with a vertical amplitude within a pre-determined range, for a pre-determined area of sample surface;

(iii) The number ($N_{GS}$) of gel-like features or streaks with a vertical amplitude within a pre-determined range, for a pre-determined area of sample surface;

(iv) The number ($N_E$) of extrinsic defects for a pre-determined area of sample surface, or the number of extrinsic defects having a defined characteristic, for a pre-determined area of sample surface; and (v) The number of features having mean or maximum X and/or Y slopes which are equal to or greater than a pre-determined level, for a pre-determined area of sample surfaces.

31. The method of claim of claim 27 wherein said sample surface is assessed by applying at least the criterion of the number ($N_E$) of extrinsic defects for a pre-determined area of sample surface, or the number of extrinsic defects having a defined characteristic, for a pre-determined area of sample surface.

32. The method of claim 27, further comprising the step of accepting or rejecting the sample surface.

33. The method of claim 1, further comprising the step of accepting or rejecting the sample surface.

34. The method of claim 27, further comprising the step of accepting or rejecting the sample surface.

35. The method of claim 27 wherein M2 is at least 20×.

* * * * *